(12) United States Patent
Piva et al.

(10) Patent No.: US 11,805,784 B2
(45) Date of Patent: Nov. 7, 2023

(54) USE OF HYDROXYAPATITE AS A CARRIER OF BIOACTIVE SUBSTANCES FOR TREATING VASCULAR DISEASES IN PLANTS

(71) Applicant: NDG NATURAL DEVELOPMENT GROUP S.R.L., Castel Maggiore (IT)

(72) Inventors: Massimo Piva, Castel Maggiore (IT); Matteo Coletti, Moscow (RU); Enrico Battiston, Musile di Piave (IT); Gianluca Manfredini, Castel Maggiore (IT)

(73) Assignee: NDG NATURAL DEVELOPMENT GROUP S.R.L., Castel Maggiore (IT)

( * ) Notice: Subject to any disclaimer, the term of this patent is extended or adjusted under 35 U.S.C. 154(b) by 355 days.

(21) Appl. No.: 17/315,557

(22) Filed: May 10, 2021

(65) Prior Publication Data
US 2021/0337808 A1 Nov. 4, 2021

Related U.S. Application Data

(63) Continuation-in-part of application No. 15/574,419, filed as application No. PCT/IB2016/052863 on May 17, 2016, now abandoned.

(30) Foreign Application Priority Data

May 18, 2015 (IT) .................. 102015000015570

(51) Int. Cl.
| | |
|---|---|
| *A01N 65/22* | (2009.01) |
| *A01N 59/20* | (2006.01) |
| *A01N 25/08* | (2006.01) |
| *A01N 65/28* | (2009.01) |
| *A01N 65/24* | (2009.01) |
| *A01N 65/36* | (2009.01) |

(52) U.S. Cl.
CPC .............. *A01N 65/22* (2013.01); *A01N 25/08* (2013.01); *A01N 59/20* (2013.01); *A01N 65/24* (2013.01); *A01N 65/28* (2013.01); *A01N 65/36* (2013.01)

(58) Field of Classification Search
None
See application file for complete search history.

(56) References Cited

U.S. PATENT DOCUMENTS

| | | |
|---|---|---|
| 6,585,946 B1 | 7/2003 | Bonfield et al. |
| 2008/0206554 A1 | 8/2008 | Riman et al. |
| 2009/0130150 A1 | 5/2009 | Gazzaniga et al. |
| 2009/0130444 A1 | 5/2009 | Godber et al. |
| 2010/0183739 A1 | 7/2010 | Newman |
| 2011/0129545 A1 | 6/2011 | Miele |
| 2011/0177149 A1 | 7/2011 | Messina |
| 2018/0139958 A1* | 5/2018 | Piva ...................... A01N 59/20 |

FOREIGN PATENT DOCUMENTS

| | | |
|---|---|---|
| EP | 0640284 A1 | 3/1995 |
| RO | 122830 B1 | 3/2010 |
| WO | 2007137606 A1 | 12/2007 |
| WO | 2010115793 A2 | 10/2010 |

OTHER PUBLICATIONS

Atsumi K., et al., "Antimicrobial soil material for plants—comprises carrier of sheet, mat, sponge or activated charcoal fibre with antimicrobial ceramics contg metal ion", WPI/Thomson, vol. 1992, No. 13 Feb. 17, 1992.
International Search Report and Written Opinion of PCT/IB2016/052863 dated Jul. 26, 2016.
Mayer I, et al., "Zinc ions in synthetic carbonated hydroxyapatites", Archive of Oral Biology, Pergamon Press, Oxford, GB, vol. 39, No. 1, Jan. 1, 1994, pp. 87-90.
Nunez, Brazilian Journal of Microbiology, 2012: 1255-1260.
Stanic V., et al., "Synthesis characterization and antimicrobial activity of copper and zinc-doped hydroxyapatite nanopowders", Applied Surface Science, Elsevier, Amsterdam, NL, vol. 256, No. 20, Aug. 1, 2010, pp. 6083-6089.

* cited by examiner

*Primary Examiner* — David J Blanchard
*Assistant Examiner* — Alissa Prosser
(74) *Attorney, Agent, or Firm* — SILVIA SALVADORI, P.C.; Silvia Salvadori

(57) ABSTRACT

The subject matter of the invention is a carrier loaded with bioactive substances, wherein the carrier is carbonate substituted hydroxyapatite and the bioactive substances are an ion and a plant extract, wherein the ion is selected from the group consisting of Cu, Zn and a combination thereof, and wherein the plant extract consists of mint extract, rosemary extract, *Ocimum basilicum* extract, lemon extract, garlic extract, clove extract, thyme extract and cinnamon extract.

4 Claims, 14 Drawing Sheets

USE OF HYDROXYAPATITE AS A CARRIER OF BIOACTIVE SUBSTANCES FOR TREATING VASCULAR DISEASES IN PLANTS

This Non-Provisional application is a Continuation-in-Part of U.S. Ser. No. 15/574,419 filed on Nov. 15, 2017, which is a National Stage of PCT/IB2016/052863 filed on 17 May 2016, which claims priority to and the benefit of Italian Application No. 102015000015570 filed on 18 May 2015, the content of which are incorporated herein by reference in their entireties.

FIELD OF THE INVENTION

The present invention relates to the use of hydroxyapatite as a carrier of bioactive substances for the treatment of vascular diseases of plants, in particular: grapevine yellows (caused by grapevine phytoplasma), bacterial canker in kiwifruit (caused by *Pseudomonas syringae*), olive quick decline syndrome (caused by *Xylella fastidiosa*) and Citrus bacterial canker disease (caused by *Xanthomonas axonopodis*).

BACKGROUND ART

Plant protection is more and more oriented to encourage the development of sustainable and innovative low impact approaches. This is even more challenging in the control of still poorly understood diseases able to severely affect the crop. It is the case of the vascular disease.

Generally, vascular diseases are responsible for the loss of turgor in an entire plant or in certain parts of a plant as a result of functional disturbances of the vascular system. The main causes of vascular diseases are related to the mycelium of phytopathogenic fungi or the accumulation of phytopathogenic bacteria or phytoplasma, which block the vascular system. This phenomenon can be the direct consequence of the toxic action of parasites on the tissues of the plant-host and/or the indirect effect after the formation in the vessels of tyloses (protoplastic swellings of the parenchymatous cells of xylem, which grow into the vessels).

The most common vascular diseases of plants are tracheomy-coses and tracheobacterioses. Tracheomycoses are a group of diseases caused by pathogenic fungi. They include, fusarium wilt and verticilliosis in cotton and many other plants. Tracheobacterioses are caused by phytopathogenic bacteria. They include bacterial wilt in solanaceae, bacterial canker in kiwifruit, tomatoes and citrus, and the olive quick decline syndrome. Transverse and longitudinal sections of the tissues of a diseased plant clearly show a darkening of plant vessels. A further form of vascular disease is caused by phytoplasma, which are bacteria-like forms and obligate parasites of plant phloem tissue. Phytoplasma are transmitting by insects (vector) and are pathogens of agriculturally important plants, as the vine in which they are responsible for the grapevine yellows, a mild yellowing to the death of infected vines.

Grapevine Yellows

Grapevine yellows (GY) are diseases associated to phytoplasmas that occur in many grape growing areas worldwide and are of still increasing significance. Grapevine phytoplasmas are localized in the phloem of infected grapevines from where it is acquired by the vector for subsequent transmission. A single infectious insect may be enough to transmit the disease, thus starting an epidemic. As no alternate host other than the grapevine is known, it is likely that the whole biological cycle is completed in grapevine and vector. Almost identical symptoms of the GY syndrome are caused by different phytoplasmas and appear on leaves, shoots and clusters of grapevine. Typical symptoms include discoloration and necrosis of leaf veins and leaf blades, downward curling of leaves, lack or incomplete lignification of shoots, stunting and necrosis of shoots, abortion of inflorescences and shrivelling of berries. Those symptoms are related to callose deposition at the sieve plates and subsequent degeneration of the phloem. Although no resistant cultivars of *Vitis vinifera* or rootstocks are known so far, the various grape varieties differ considerably as far as symptom severity is concerned. It ranges from fast decline and death in highly susceptible cultivars to tolerant rootstocks as symptomless carriers of the pathogen. Although phytoplasmas are non culturable microorganisms and, in the case of GY, Koch's postulates have not yet been fulfilled, when phytoplasmas of a specific group or subgroup are found consistently associated with a specific grape disease, they are regarded as being its causal agents. Phytoplasma groups detected in grapevine are: Stolbur group that is also the cause agent of Bois noir (BN), Elm yellows that is also the cause agent of Flavescence dorée (FD) and Aster yellow group. Management of GY is based on the control of their vectors by treating periodically the vineyards with insecticides: management of FD includes the eradication of infected plants that serve as sources for infection as well as the control of the vectoring leafhopper *Scaphoideus titanus*. Biological control of *S. titanus* is not yet applicable. Due to the more complex epidemic cycle of BN that includes alternative host plants as sources of inoculum and a non-ampleophagous vector whose life history puts it out of reach of insecticides, control of BN is considerably more difficult and less efficient than control of FD. There are no direct methods of control on GY.

Bacterial Canker in Kiwifruit

The bacterial canker of kiwifruit caused by *Pseudomonas syringae* pv. actinidiae is a severe threat to kiwifruit production worldwide. Many aspects of *P. syringae* pv. actinidiae biology and epidemiology still require in-depth investigation. The spread of *P. syringae* pv. actinidiae in xylem and phloem was investigated by carrying out artificial inoculation experiments with histological and dendrochronological analyses of naturally diseased plants in Italy: it was found that the bacterium can infect host plants by entering natural openings and lesions. In naturally infected kiwifruit plants, *P. syringae* pv. actinidiae is present in the lenticels as well as in the dead phloem tissue beneath the lenticels, surrounded by a lesion in the periderm. In cases of advanced stages of *P. syringae* pv. actinidiae infection, neuroses of the phloem occur, which are followed by cambial dieback and most likely by infection of the xylem. Anatomical changes in wood such as reduced ring width, a drastic reduction in vessel size, and the presence of tyloses were observed within several infected sites. In the field, these changes occur only a year after the first leaf symptoms are observed suggesting a significant time lapse between primary and secondary symptoms. A series of studies and field trials concerning epidemiology, agronomical techniques, new bactericides effectiveness as well as molecular typing analysis, genomic and proteomic, allowed to elucidate the cycle of disease of the pathogen, to modify some basic agronomical techniques and to allow the farmers to coexist with the pathogen by reaching the full yield and quality of the crop as before the appearance of the disease. Nevertheless there are no high effective and low toxic chemical controls for the bacterial cancer of kiwifruit.

Olive Quick Decline Syndrome

The olive quick decline syndrome (OQDS) is a disease that appeared suddenly a few years ago in the province of Lecce, Salento peninsula (south-eastern Italy). The major incident of the disease is *Xylella fastidiosa*, a quarantine pathogen of American origin whose unwelcome introduction in the area has created much disturbance because: (i) the dramatic damage suffered by the olive groves where the pathogen has established itself; (ii) the alarm that this finding has raised in a country (Italy) whose olive/oil industry is a primary asset, and in the European Union, which is facing the first confirmed record in its territory of this alien and much feared microorganism. OQDS is characterized by the presence of leaf scorching and desiccation of twigs and small branches, that prevail first in the upper part of the canopy, then extend to the rest of the crown, which acquires a burned look. The more seriously affected plants are heavily pruned by the growers to favour new growth, which however, is scanty and dried in a short while. The skeletal-looking trees push a multitude of suckers from the base and survive for some time, i.e. as long as the roots are viable. *X. fastidiosa* is a bacterium with an unusual epidemiology (plant-to-plant transmission occurs only via insect vectors), that infects a wide range of hosts (309 plant species belonging to 193 genera, according to a recent list issued by the European Food Safety Authority). It invades, multiplies and occludes the plant's xylem vessels, thus impairing water uptake. In the case of olive, the damage may be aggravated by the presence of fungi of different genera, *Phaeoacremonium* and *Phaemoniella* in particular, but also *Pleumostomophora* and *Neofusicoccum*, which colonize and necrotize the sapwood. Besides olive, the Salentian strain of *X. fastidiosa* infects in nature a number of woody (almond, cherry) and shrubby (oleander, broom, rosemary, *Acacia saligna, Polygala myrtifolia, Westringia fruticosa, Rhamnus elaternus, Myrtus communis*) hosts but not grapevines and citrus. A clue to the search for *X. fastidiosa* in OQDS-affected olives was given by: (i) the symptoms, which recalled very much the severe leaf scorching of fruit and shade trees induced by this bacterium, as described in the north American literature; (ii) the modality of disease spreading, which was compatible with that of *X. fastidiosa* infections. *Philaenus spumarius* (meadow spittlebug), a froghopper quite common in the Salento area where it thrives on olive, was experimentally identified as the main vector. Current knowledge tells that disease eradication and sanitation of *Xylella* infected plants, olive included, are unfeasible. The only measures envisaged to contain the disease diffusion are mechanical weeding in spring, to kill as many juveniles as possible of the vector, which thrive especially on weeds, followed by insecticide treatments to olive trees, on which the adults move after moult and live happily. These measures are accompanied by the more drastic and unpopular one: uprooting the infected olive trees (many of them are several century-old giants) and the surrounding ones.

Citrus Bacterial Canker Disease

Citrus canker is a disease affecting *Citrus* species caused by the bacterium *Xanthomonas axonopodis*. The bacterium *Xanthomonas axonopodis* pv. citri is a rod-shaped, gram-negative, and has a single polar flagellum. The maximum and optimum temperature ranges for growth are to 39° C. (95 to 102° F.) and 28 to 30° C. (82 to 86° F.), respectively. In general, in field plantations, grapefruit, Mexican limes and trifoliate orange are highly susceptible to canker; sour orange, lemon, and sweet orange are moderately susceptible; and mandarins are moderately resistant. Within orange cultivars, early maturing cultivars are more susceptible than mid season cultivars which are in turn more susceptible than late season cultivars. However, when plant tissues are disrupted by wounds or by the feeding galleries of the Asian leafminer, internal leaf tissues (mesophyll) are exposed. When this occurs, all cultivars and most citrus relatives that express some level of field resistance can become infected. Citrus canker can be a serious disease where rainfall and warm temperatures are frequent during periods of shoot emergence and early fruit development. This is especially the case where tropical storms are prevalent. Citrus canker is mostly a leaf-spotting and fruit rind-blemishing disease, but when conditions are highly favourable for infection, infections cause defoliation, shoot dieback, and fruit drop. Citrus canker lesions start as pinpoint spots and attain a maximum size of 2 to 10 mm diameter. The young lesions are raised or 'pustular' on both surfaces of the leaf, but particularly on the lower leaf surface. A characteristic symptom of the disease on leaves is the yellow halo that surrounds lesions. A more reliable diagnostic symptom of citrus canker is the water-soaked margin that develops around the necrotic tissue, which is easily detected with transmitted light. Citrus canker lesions on fruit and stems extend to 1 mm in depth, and are superficially similar to those on leaves. On fruit, the lesions can vary in size because the rind is susceptible for a longer time than for leaves and more than one infection cycle can occur. Infection of fruit may cause premature fruit drop but if the fruit remain on the tree until maturity such fruit have reduced fresh fruit marketability.

The first line of defense against citrus canker is exclusion. Citrus canker still does not exist in some countries or regions of countries where climatic conditions are favourable for pathogen establishment, which is probably because of rigid restrictions on the importation of propagating material and fruit from areas with canker. Unfortunately, with increased international travel and trade, the likelihood of *X. axonopodis* pv. citri introduction is on the rise as it is with many exotic pests and pathogens. Where canker is a major problem, control requires integration of appropriate cultural practices including sanitation, windbreaks and leafminer control with frequent applications of copper sprays. Copper sprays have been shown to reduce infection somewhat. Once introduced into an area, elimination of inoculum by removal and destruction of infected and exposed trees is the most accepted form of eradication.

The economic impact of the vascular diseases in agriculture is the consequence of several critical aspects, beside also the incomplete knowledge of the symptoms expression mechanisms. The main critical aspect is the vascular localisation of the pathogens responsible for the diseases and the difficulty to control them by a control agent within the vascular tissues.

Therefore, there is still the need to provide agents that are able to control vascular diseases in plants.

Hydroxyapatite is well known in the prior art in different forms and for different applications. For example, synthetic hydroxyapatite constitutes an excellent biomaterial for biomedical applications, notably for bone reconstruction.

Hydroxyapatite and synthetic substituted hydroxyapatite can be produced by different processes, by wet, hydrothermal, electrochemical, sol-gel or solid state synthesis. It can be found in different stoichiometric, morphological and crystalline forms.

Carriers of stoichiometric hydroxyapatite are known from JPH0556105 which describes the use of hydroxyapatite as a carrier for an antimicrobial metal ion selected from silver, copper and zinc to sterilize a soil from the presence of the plant pathogenic fungus *Pythium*. The action of the antimicrobial metal ion is limited to the soil since the publication specify that the agent is hardly absorbed into the plant.

EP0640284 describes an antimicrobial sand coated with a stoichiometric hydroxyapatite carrier containing antimicrobial agents, such as silver, copper or zinc ions. The antimicrobial sand is mixed with the soil used to grow flowering plants, such as orchids, cyclamen etc., to sterilize the soil against the fungi: *Rhizoctonia, Fusarium, Sclerotinia* and *Pyshium*.

RO 122830 describes a fungicide composition, based on salts of N,N-ethylene-bis-thiocarbamic acid, characterized by the fact that it consists of 40-50% zinc N,N-ethylene-bis-thiocarbamate or a mixture thereof with the manganese salt or manganese and iron salt, 30-50% hydroxyapatite, 1.5-3% $SiO_2$ and 20-50% potassium acetate.

Prior art JPH0556105 and EP 0 640 284 does not describe the use of substituted hydroxyapatite as a carrier of active principles. Prior art does not describe the use of hydroxyapatite as carrier of active substances for the treatment of plant pathologies by application of the carrier on the plant. Prior art teaches only a way to sterilize the soil used to grow the plants, in particular flowering plants (not crops).

Prior art RO 122830 does not describe the use of hydroxyapatite as a carrier of bioactive substances for the treatment of vascular diseases, in particular: grapevine yellows, bacterial canker in kiwifruit, olive quick decline syndrome and Citrus bacterial canker disease.

SUMMARY OF THE INVENTION

The present invention provides the use of substituted hydroxyapatite as a carrier of (i.e. loaded with) bioactive substances intended for treating vascular diseases, in particular grapevine yellows, bacterial canker in kiwifruit, olive quick decline syndrome and citrus bacterial canker disease.

The substituted hydroxyapatite is substituted with at least one ion selected from carbonate ion or metal ion. The hydroxyapatite of the invention can be substituted by both at least one carbonate ion and at least one metal ion. The metal ion is preferably selected from: Mg, Zn, Pb, Cd, Ba, K, Mn, Cu, Mo, Fe, Ag, B and Se. Preferably the hydroxyapatite is substituted with carbonate ions only.

The carbonate substitution, but also the metal ion substitution, has the advantage of lowering the crystallinity degree of hydroxyapatite, which thus become more amorphous. The amorphous state leads to an increase of solubility of the hydroxyapatite structure in a biological environment, with the advantage that the active principle release is improved and becomes more effective.

The hydroxyapatite carrier loaded with al least one bioactive substance of the invention is applied to the plants affected by vascular diseases, in particular grapevine yellows, bacterial canker in kiwifruit, olive quick decline syndrome and citrus bacterial canker disease, and penetrates into the plants through natural openings, as explained in details below, thus realizing an intimate contact with pathogen cells that can be present both on the plant surface or inside the plant.

Preferably the bioactive substance is a metal ion, such as Cu, Zn and S. Such ions have an anti-parasite action. Other examples of bioactive substances useful for the purposes of the invention are metal ions, such as Mn, Mg, K, Fe, B, Mo, Se (acting as fertilizers and nutritional elements), and extracts of vegetal origin, such as extracts of: lignin, mint, thyme, rosemary, sesame, soya, cloves, garlic, lemon, cinnamon, *Abies sibirica, Malpighia glabra, Achillea millefolium. Allium sativum, Medicago sativa, Aloe vera Citrus sinensis, Artemisia annua, Arnica Montana, Ocimum basilicum, Betula pendula, Betula pubescens, Calendula officinalis, Matricaria chamomilla, Chamaemelum nobile, Cinnamomum verum, Centella asiatica, Chelidonium majus, Syzygium aromaticum, Allium cepa, Equisetum arvense, Curcuma longa, Echinacea purpurea, Echinacea angustifolia, Eucalyptus globulus, Hypericum perforatum, Fucus vesiculosus, Gentiana lutea, Lavandula angustifolia, Citrus limon, Melilotus officinalis, Melissa officinalis, Punica granatum, Mentha piperita, Vaccinium myrtillus, Orthosiphon stamineus, Urtica dioica, Olea europeae, Tabebuia impetiginosa, Plantago lanceolata, Hieracium pilosella, Pinus sibirica, Polypodium leucotoms, Citrus paradise, Quassia amara, Rheum Thais, Rosa canina, Rosmarinus officinalis, Ruscus aculeatus, Salix alba, Salvia officinalis, Camelia sinensis, Tilia tomentosa, Thymus vulgaris, Arctostaphylos uva-ursi. Valeriana officinalis, Solidago virgaurea, Loranthus europaeus, Zingiber officinale*. The vegetal extracts can have both nutritional activity and mild anti-parasite activity.

The invention refers also to a carrier of hydroxyapatite having the above characteristics, comprising a bioactive substance adsorbed thereto, thus yielding a hydroxyapatite loaded with at least one bioactive substance.

For the scope of the present invention, "hydroxyapatite functionalized with a bioactive substance" is a definition equivalent to say that the bioactive substance is adsorbed on the hydroxyapatite.

In a preferred embodiment, the present invention relates to a carrier loaded with bioactive substances, wherein the carrier is carbonate substituted hydroxyapatite and the bioactive substances are an ion and a plant extract, wherein said ion is selected from the group consisting of Cu, Zn and combination thereof, wherein said bioactive substances are adsorbed on the hydroxyapatite, wherein in said carbonate substituted hydroxyapatite the copper ion is adsorbed in an amount ranging from 20 to 80 weight % with respect to the weight of said carbonate substituted hydroxyapatite and/or the zinc ion is adsorbed in an amount ranging from 5 to 30 weight % with respect to the weight of said carbonate substituted hydroxyapatite, wherein said plant extract is adsorbed in an amount ranging from 1 to 50 weight % with respect to the weight of said carbonate substituted hydroxyapatite, and wherein the plant extract consists of:

from 10 to 40 weight % of mint extract;
from 15 to 35 weight % of rosemary extract;
from 5 to 15 weight % of *Ocimum basilicum* extract;
from 3 to 23 weight % of lemon extract;
from 1 to 10 weight % of garlic extract;
from 3 to 20 weight % of cloves extract;
from 3 to 13 weight % of thyme extract; and
from 3 to 10 weight % of cinnamon extract.

BRIEF DESCRIPTION OF THE DRAWINGS

FIGS. 1A-D show the results of the laboratory test on *Phaeomoniella chlamydospora*.

FIGS. 2A-D show the results of the laboratory test on *Phaeoacremonium aleophilum*.

FIG. 3 show the results (yield) of the nursery test on *Agrobacterium vitis*.

FIG. 4 show the results (frequency of symptoms) of the nursery test on *Agrobacterium vitis*.

DETAILED DESCRIPTION OF THE INVENTION

Figure 1A:
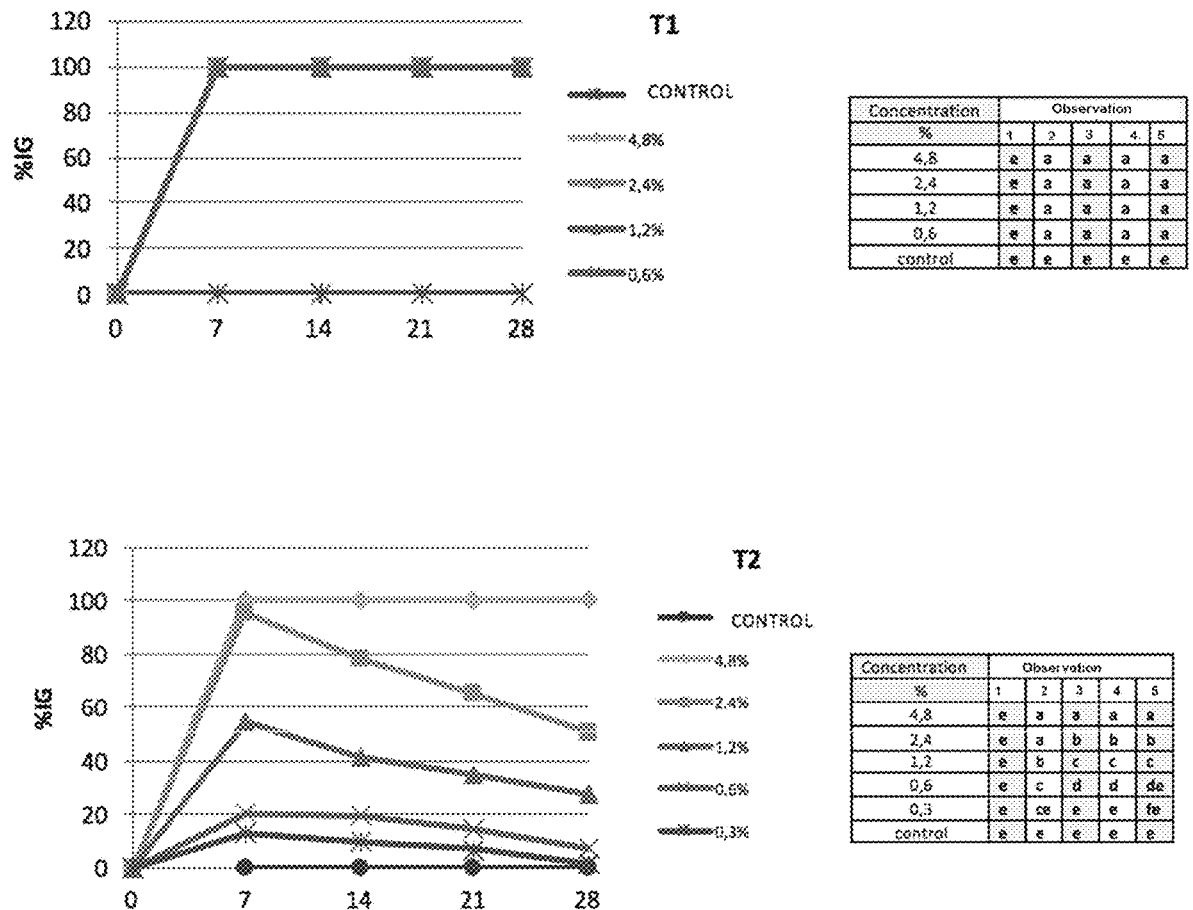
Figure 1B:
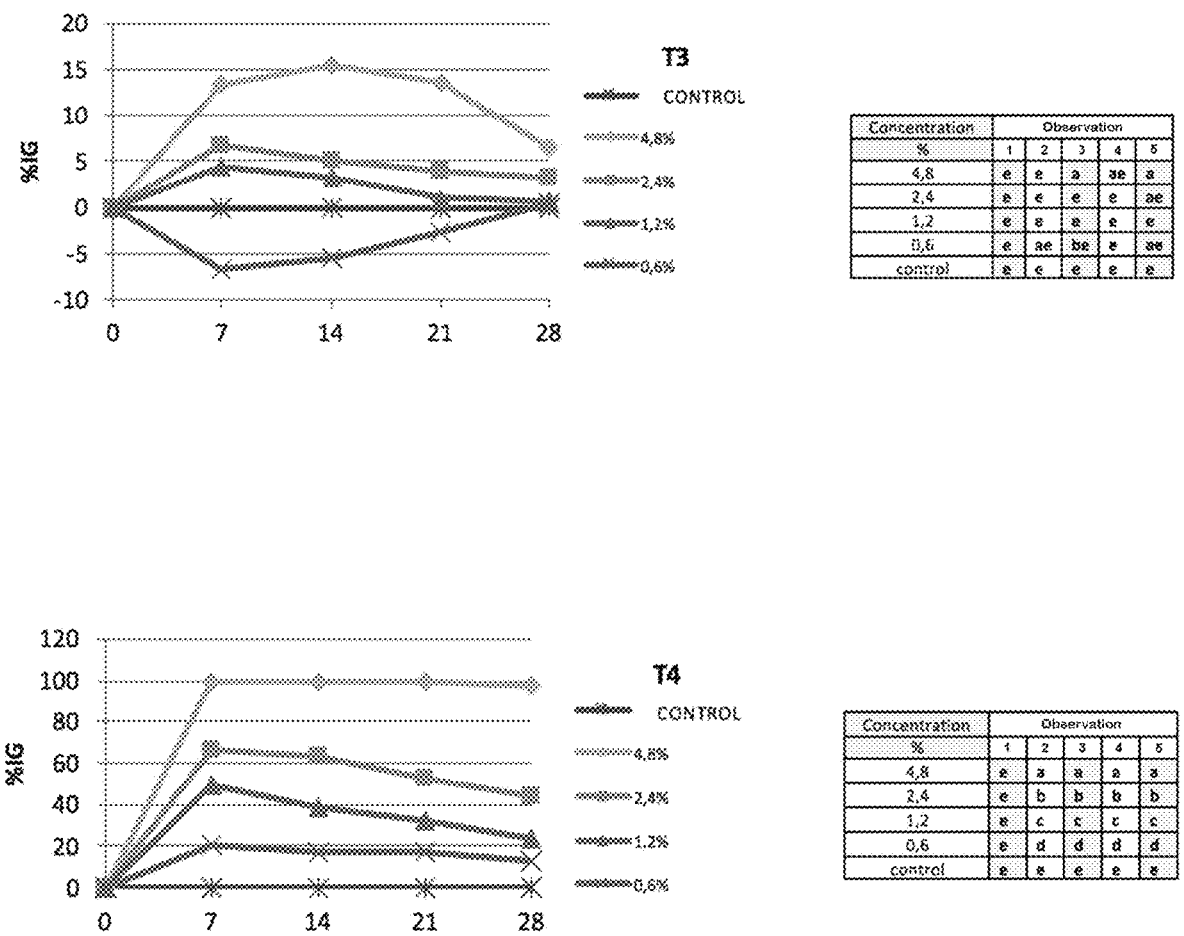
Figure 1C:
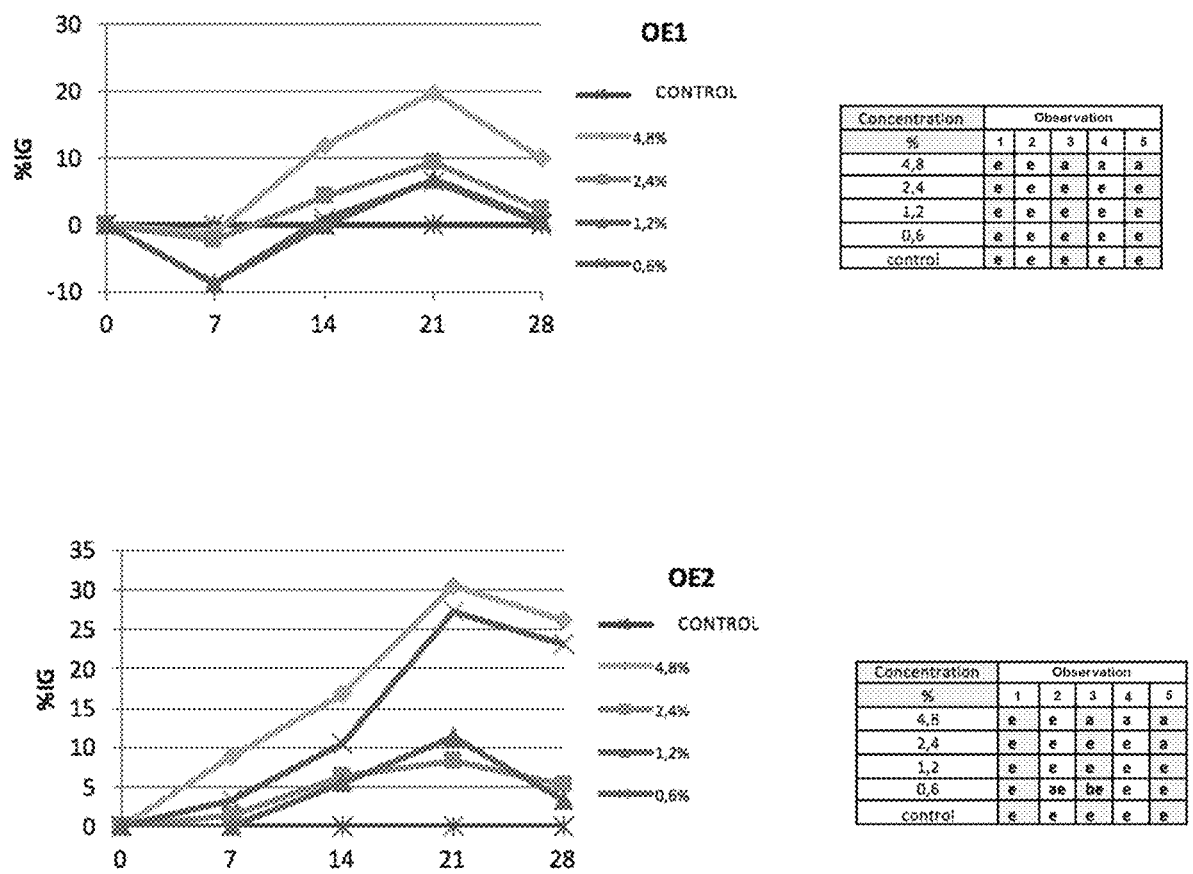
Figure 1D:
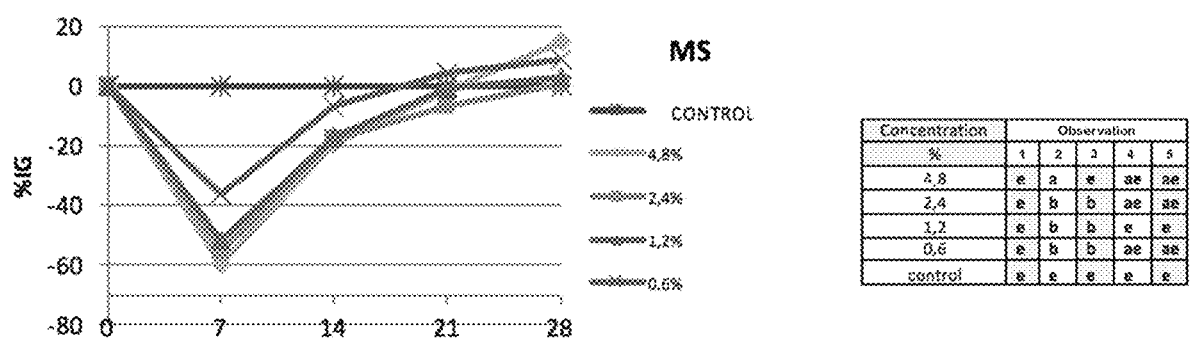
Figure 2A:
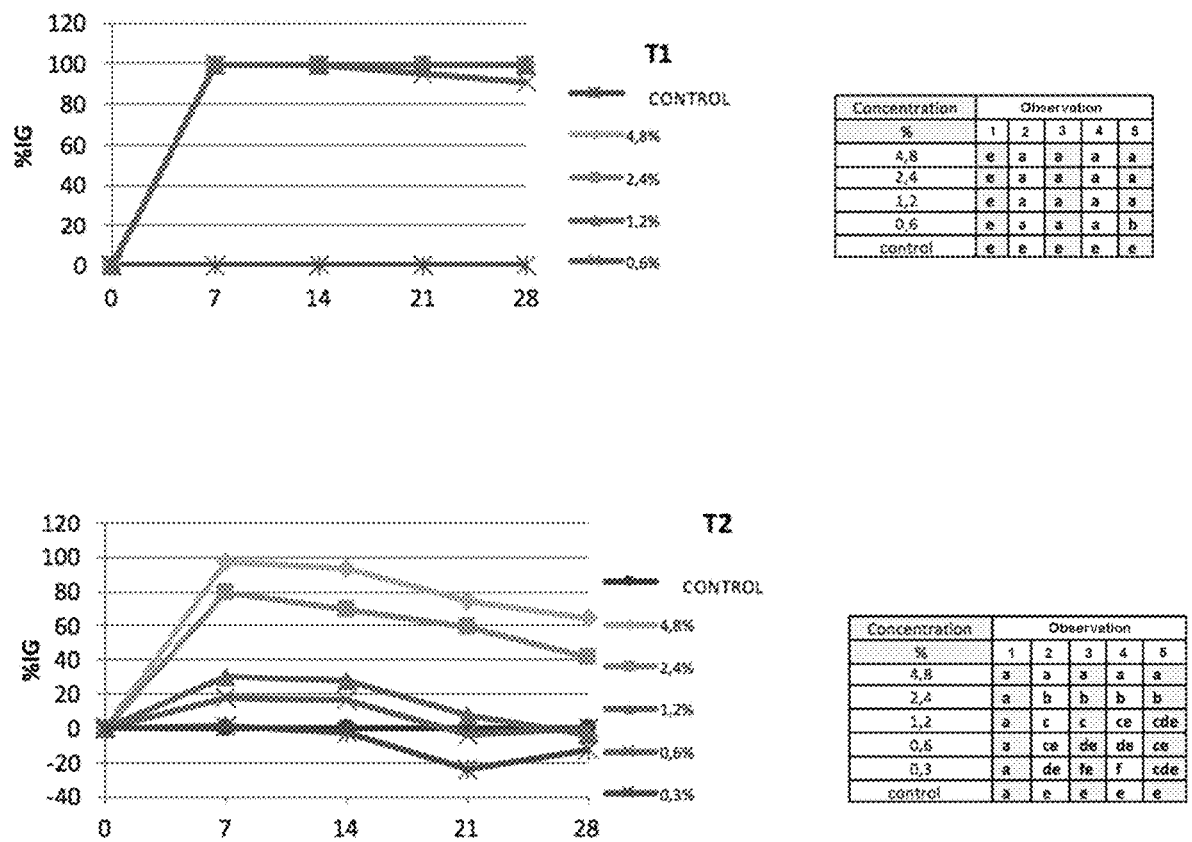
Figure 2B:
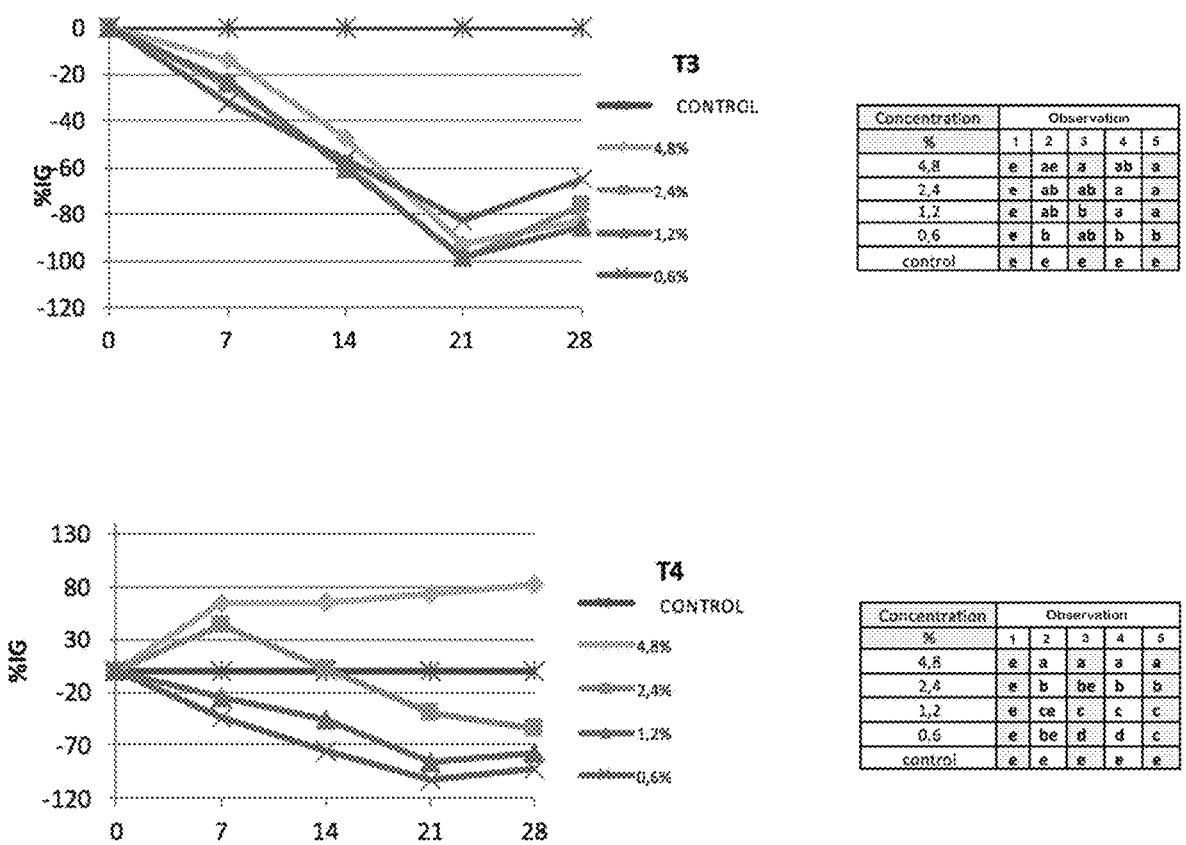
Figure 2C:
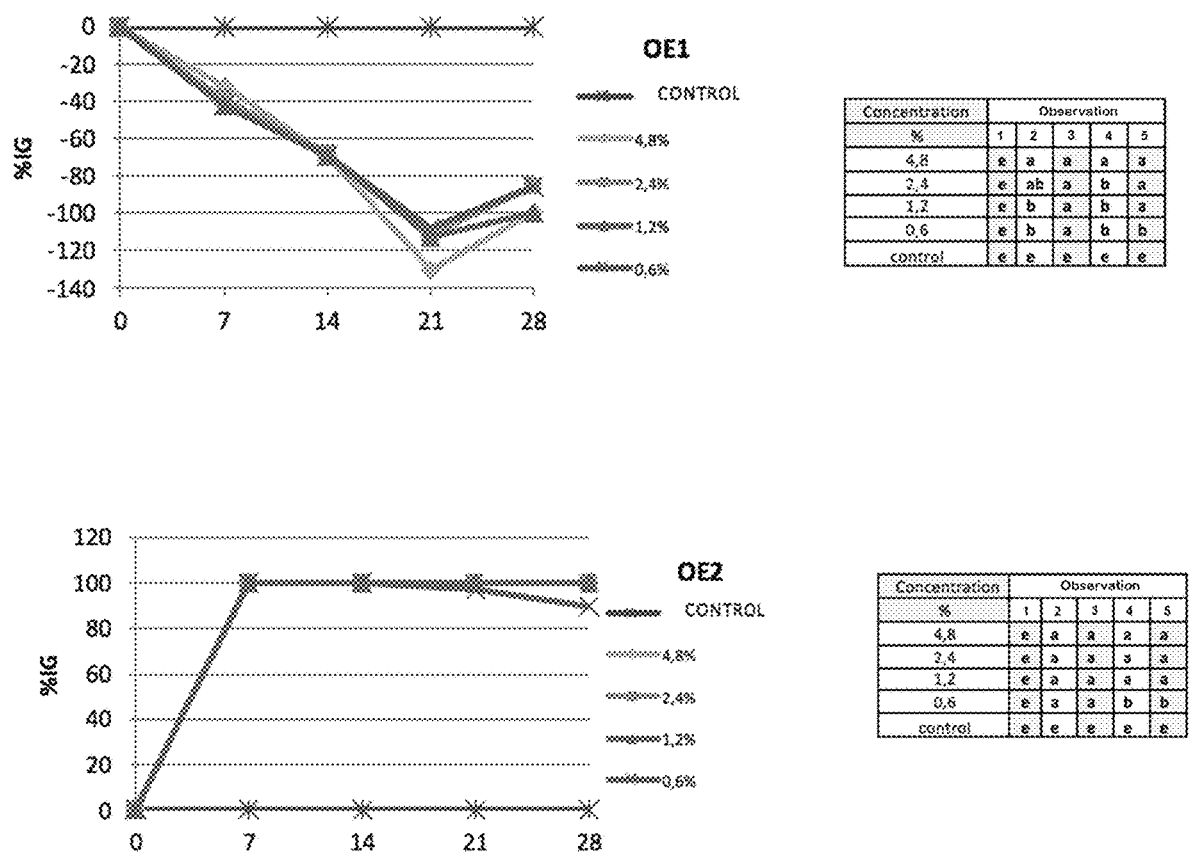
Figure 2D:
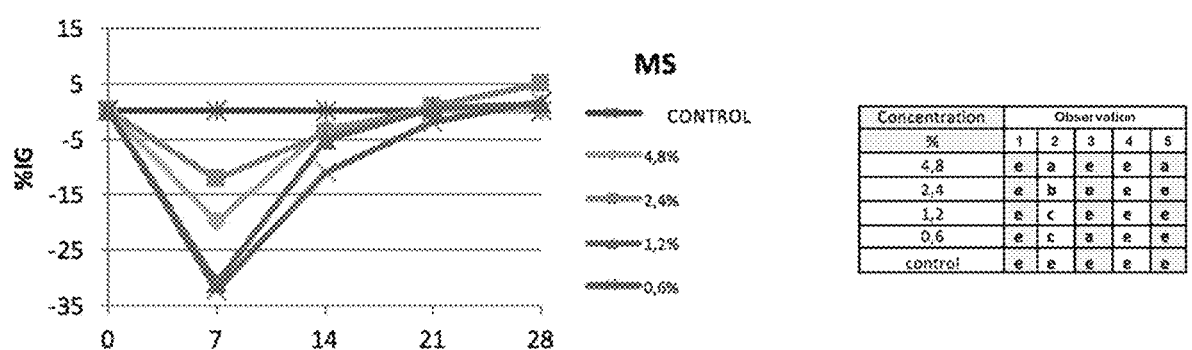

With "substituted hydroxyapatite" in the present invention, it is intended to refer to hydroxyapatite of the formula $Ca_{10}(PO_4)_6(OH)_2$ in which the Ca, $PO_4$ and/or OH ions are replaced, in the crystal lattice of hydroxyapatite, with one or more ions of the same or different species.

For the scope of the present invention, "hydroxyapatite functionalized with a bioactive substance" is a definition equivalent to say that the bioactive-substance is "adsorbed" or "loaded" on the hydroxyapatite and also equivalent to say that hydroxyapatite is a carrier of bioactive substances.

With "vegetal extract" in the present invention it is intended to refer to a mixture of natural substances derived from the mechanical or chemical treatment of various parts of plants, mainly seeds, but also fruits (in particular peel or skin of the fruits) and other parts of plants (e.g. leaves). The vegetal extracts according to the invention are preferably prepared using a chemical method of treating seeds, flower, leaves, fruits (in particular the peel or skin of the fruits) (or other parts of the plants) with an alcoholic and/or hydro-alcoholic solution and then removing the solvent to obtain a hygroscopic powder. The vegetal extracts of the invention can be used either in the form of a powder or in the form of an alcoholic or hydro-alcoholic solution. The vegetal extracts of the invention can be also essential oils.

With "bioactive substance" in the present invention it is intended to refer to substances that have a nutritional activity and/or a phytosanitary activity. For "phytosanitary treatment" or "phytosanitary activity" it is intended the treatment or prevention of plant diseases caused by parasites such as cryptogams, bacteria, fungi, phytoplasma and insects.

For "nutritional treatment" or "nutritional activity" it is intended to refer to bioactive substances that help the development of the plant natural defences (and thus help plants to fight against diseases), keeping the plant in the best nutrition balance, fundamental prerogative to prevent any disease development.

The bioactive substance used in the invention can have both a phytosanitary activity and a nutritional activity and thus can be used for both phytosanitary and nutritional treatment of the plants, depending on the dosage of use.

The present invention relates to the use of substituted or non-substituted hydroxyapatite as a carrier of (i.e. loaded with) bioactive substances intended for treating vascular diseases, in particular: grapevine yellows, bacterial canker in kiwifruit, olive quick decline syndrome and citrus bacterial canker disease.

Preferably, the hydroxyapatite is substituted with at least one carbonate ion or at least a metal ion or with both at least one carbonate ion and at least a metal ion.

In a preferred embodiment, the substituted hydroxyapatite carrier of the invention has the following formula:

$$Ca_{(10-x)}M_x(PO_4)_{(6-y)}(CO_3)_y(OH)_2$$

where:
M is chosen from Mg, Zn, Pb, Cd, Ba, K, Mn, Cu, Mo, Fe, Ag, B and Se or a combination of at least two of such elements, x is comprised between 0 and 2, preferably between 0 and 1, more preferably between 0 and 0.8, even more preferably between 0.02 and 0.05;

and y is comprised between 0 and 2, preferably between 0 and 1, more preferably between 0.002 and 0.030, with the proviso that x and y are never equal to 0 at the same time.

The hydroxyapatite included in the above formula can be substituted with carbon ions only or metal ions only or a mixture of carbonate and metal ions.

In a preferred embodiment, the hydroxyapatite carrier of the invention is substituted by at least one carbonate ion, and has the following formula:

$$Ca_{(10)}(PO_4)_{(6-y)}(CO_3)_y(OH)_2$$

wherein y is comprised between 0 and 2, preferably between 0 and 1, more preferably between 0.002 and 0.030.

The carbonate substitution can occupy site B ($PO_4^{3-}$ phosphate ions) as per general formulae above and/or site A (OH hydroxyl ions) of the hydroxyapatite. The ratio of substitution on site A/substitution on site B is comprised between 0.10 and 0.60 and even more preferably the ratio is comprised between 0.20 and 0.40.

In the hydroxyapatite structures considered in the present invention, the substitution is preferably on site B, with a percentage of carbonate occupying the B site that is greater than or equal to 55% in weight, even more preferably comprised between 90 and 100% in weight of the total weight of carbonate contained in the hydroxyapatite.

The overall content of carbonate in the hydroxyapatite according to the invention is from 1 to 20%, preferably from 5 to 15% in weight of the total hydroxyapatite structure.

The carbonate ion substitutions, preferably at site B, are very significant since they allow the whole hydroxyapatite structure to increase its solubility in a biological environment.

According to a preferred embodiment the above substituted hydroxyapatite has a crystallinity degree comprised between 25 and 75%, preferably between 25 and 40%. Preferably, the hydroxyapatite carrier is in the form of particles smaller than 2 μm, preferably sized between 0.2 and 0.9 μm. The hydroxyapatite particles are preferably in crystalline form, i.e. they are joined together to create aggregates of hydroxyapatite particles (also referred to in this application as "clusters" or "crystals" or "microcrystals" or "microcrystalline aggregates", all these terms having the same meaning as "aggregates" according to the invention). These aggregates have micrometric dimensions, with a size comprised between 0.5 and 25 μm, more particularly between 0.5 and 5 μm and having a significant surface area. In particular, hydroxyapatite aggregates useful according to the present invention have a surface area comprised between 60 and 120 $m^2/g$, more particularly between 70 and 90 $m^2/g$.

The aggregates of hydroxyapatite have the advantage of a larger surface area with respect to single hydroxyapatite particles and therefore allows adsorbing more bioactive molecules and controlling the release of them in the environment. Thus for a small quantity of hydroxyapatite it is possible to transport a significant number of bioactive molecules which allows the activity and biological effectiveness of the molecules to be increased further.

The bioactive substances having anti-parasite and/or nutritional activity used in the present invention can be metal ions, such as Cu, Zn and S. Such ions have an anti-parasite action. Other examples of bioactive substances useful for the purposes of the invention are metal ions, such as Mn, Mg, K, Fe, B, Mo, Se (acting as fertilizers and nutritional elements), and extracts of vegetal origin, such as extracts of: lignin, mint, thyme, rosemary, sesame, soya, cloves, garlic, lemon, cinnamon, *Abies sibirica, Malpighia glabra, Achillea millefolium, Alarm sativum, Medicago sativa, Aloe vera Citrus sinensis, Artemisia annua, Arnica Montana, Ocimum basilicum, Betula pendula, Betula pubescens, Calendula officinalis, Matricaria chamomilla, Chamaemelum nobile, Cinnarnomum verurn, Centella asiatica, Chelidonium majus, Syzygium aromaticum, Allium cepa, Equisetum arvense, Curcuma longa, Echinacea purpurea, Echinacea angustifolia, Eucalyptus globulus, Hypericum perforatum, Fucus vesiculosus, Gentiana lutea, Lavandula angustifolia, Citrus limon. Melilotus officinalis, Melissa officinalis, Punica granatum, Mentha piperita, Vaccinium myrtillus, Orthosiphon stamineus, Urtica dioica, Olea europeae, Tabebuia impetiginosa, Plantago lanceolata, Hieracium pilosella, Pinus sibirica, Polypodium leucotoms, Citrus paradise, Quassia amara, Rheum Thais, Rosa caning, Rosmarinus officinalis, Ruscus aculeatus, Salix alba, Salvia officinalis, Camelia sinensis, Tilia tomentosa, Thymus vulgaris, Arctostaphylos uva-ursi, Valeriana officinalis, Solidago virgaurea, Loranthus europaeus, Zingiber officinals*. The vegetal extracts can have both nutritional activity and mild anti-parasite activity.

The bioactive substances are adsorbed on to the hydroxyapatite carrier, thus obtaining a hydroxyapatite loaded with at least a bioactive substance.

The absorption of such substances on hydroxyapatite can be performed by all processes known to a person skilled in the art. The crystallised hydroxyapatite aggregate has an inner zone that is purely crystalline and an outer peripheral zone with electrical charges that are not completely neutral, which allows the bioactive molecules to be retained.

For example, in the case of adsorption of copper and/or sulphur on hydroxyapatite particles, the adsorption can therefore be obtained:

for copper starting from: sulfate (II) pentahydrate, copper chloride, copper oxychloride, copper hydroxide, copper oxide or a mixture of these compounds;

for sulphur starting from: soluble sulphur, micronized sulphur, atomised sulphur or a mixture of these compounds;

for Mn starting from: Manganese sulphate;

for Mg starting from: Magnesium sulphate. Magnesium oxide;

for K starting from: Potassium chloride, Potassium sulphate;

for Fe starting from: Iron sulphate;

for B starting from: Boric acid;

for Mo starting from: Sodium molybdate.

For the use according to the invention, hydroxyapatite loaded with the active substance is preferably integrated into a composition, preferably in the form of microcrystalline aggregates. This composition may be in all forms, notably powder, granules, liquid or gel. According to a preferred embodiment, aggregates of hydroxyapatite are dispersed in a uniform way in water. The pH of the composition in liquid form is preferably greater than 5 so as to prevent that the microcrystals of hydroxyapatite undergo partial or total hydrolysis.

Such a liquid composition allows foliar application, in particular by spraying. The structure and micrometric size of the hydroxyapatite crystals mean that they are dispersed uniformly within the volume of the micronized droplets during spraying, thus allowing good distribution throughout the total volume used for application and consequently more uniform distribution on the application surface. According to the type of atomiser used for the application of hydroxyapatite, it is possible to have droplets whose diameter varies between 50 and 800 μm. In order to avoid or limit drifting of very small droplets and discharge of very large droplets, and to guarantee better application on the surface to be treated, it is possible to use spraying means that allow droplets sized between 150 and 250 μm to be obtained.

Once applied, the aggregated particles adhere to the leaf without needing to use anti-stripping agents in the composition. In fact, according to their surface, their size, their morphological irregularities and their electrostatic characteristics, the hydroxyapatite crystals cling onto the surface of the leaves, thus ensuring optimal adhesion resistance to run off water, unlike currently existing products that are carried away by rain or dew. The use of the compositions, applied per hectare, is to be adapted according to the climatic conditions encountered, the season and the protection and nutrition strategies of the soil.

Preferably the compositions contain between 5 and 70% of hydroxyapatite and/or aggregates of particles of hydroxyapatite, even more preferably between 6 and 60% (as percentage by weight of total solids of the composition).

In the case of an aqueous formulation for foliar application, the hydroxyapatite particles and/or aggregates of particles of hydroxyapatite are preferably between 2 and 5% by weight of the total weight of the composition.

Preferred dosages are between 2 and 5 kg, preferably 2.5 kg per hectare to 250l/ha in full vegetative development, with a density of about 4000 stem/ha.

An example of a particularly suitable application protocol is:

Implementation in the autumn before the leaves fall (descending sap) after harvest Winter application immediately after the size (same day or next day)

Spring application before flowering (rising sap)

Application in late June, July and early August after flowering.

A further application may be performed in case of hail.

Once applied to the plant, the bioactive substances may be directly released or the hydroxyapatite microcrystals may transport these substances into the intercellular spaces. Bioactive substances are thus released by hydrolysis, in proximity to targets, in particular in proximity to target parasites such as fungi and bacteria.

In fact, the microcrystalline aggregates of hydroxyapatite penetrate into the plant according to passive diffusion following the discharge of fluids, such as carbon dioxide and water, through the natural openings of the plant tissues. Inside the plant, the hydroxyapatite behaves like a "sol-gel": it is not stagnant in a liquid medium, it moves in the xylem and the phloem by following the circulating lymph. Hence there is no risk of accumulation in the plant. When the hydroxyapatite meets a pathogen, the aggregate decomposes as the more acidic wall of the microorganism promotes dissolution and the release of bioactive molecules carried by the hydroxyapatite, which can therefore act against the pathogen.

The bioactive substances follow the lymphatic flow and exercise their activity in particular as fertilisers for improving the development of the plant and/or reinforcing its natural defences. Unlike the conventional methods, there is therefore no action on the intracellular metabolic pathways, but a contact action between the functional elements of the hydroxyapatite aggregates and the pathogens on an intercellular level or at the surface of the plants.

The bioactive substances can therefore act when they are sprayed onto the surface but also in depth into the core of the plant tissues treated.

The hydroxyapatite particles can also be used for application on the trunk, on the wood of plants or on their roots according to the aim of the application.

According to another aspect, the invention relates to hydroxyapatite particles loaded with at least one bioactive substance. In other words, the invention refers to a carrier of hydroxyapatite particles (or aggregates) comprising bioactive substances adsorbed thereto. The bioactive substances are those listed above.

In a preferred embodiment, the present invention relates to a carrier loaded with bioactive substances, wherein the carrier is carbonate substituted hydroxyapatite
and
the bioactive substances are an ion and a plant extract, wherein said ion is selected from the group consisting of Cu, Zn and combination thereof,
wherein said bioactive substances are adsorbed on the hydroxyapatite,
wherein in said carbonate substituted hydroxyapatite the copper ion is adsorbed in an amount ranging from 20 to 80 weight % with respect to the weight of said carbonate substituted hydroxyapatite and/or the zinc ion is adsorbed in an amount ranging from 5 to 30 weight % with respect to the weight of said carbonate substituted hydroxyapatite, wherein said plant extract is adsorbed in an amount ranging from 1 to 50 weight % with respect to the weight of said carbonate substituted hydroxyapatite, and
wherein the plant extract consists of:
from 10 to 40 weight % of mint extract;
from 15 to 35 weight % of rosemary extract;
from 5 to 15 weight % of *Ocimum basilicum* extract;
from 3 to 23 weight % of lemon extract;
from 1 to 10 weight % of garlic extract;
from 3 to 20 weight % of cloves extract;
from 3 to 13 weight % of thyme extract; and
from 3 to 10 weight % of cinnamon extract.

Preferably, the loaded carrier is in the form of an aggregate of carbonate substituted hydroxyapatite particles, wherein the aggregate has a size comprised between 0.5 and 5 μm.

In a further preferred embodiment, the present invention relates also to a composition comprising said loaded carrier in a quantity of 5-70% in relation to the total weight of dry material of the composition.

Preferably, in the loaded carrier the carbonate-substituted hydroxyapatite has the following formula:

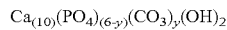

$$Ca_{(10)}(PO_4)_{(6-y)}(CO_3)_y(OH)_2$$

wherein y is comprised between 0.002 and 2.0.

The invention also relates to aggregates of hydroxyapatite particles loaded with at least a bioactive substance as described above. These clusters have a size comprised between 0.5 and 25 μm, preferably comprised between 0.5 and 5 μm.

The invention also relates to a composition comprising at least one hydroxyapatite particle or at least one aggregate of hydroxyapatite particles according to the invention, loaded with bioactive substances. Preferably, such a composition comprises between 5 and 70% in weight of hydroxyapatite particles and/or aggregates in relation to the total weight of the dry material of the composition, even more preferably between 6 and 60%. The invention is now illustrated by the following examples, outlined in the following Sections I and II.

EXPERIMENTAL SECTION I—TESTS ON VINE DISEASES

Manufacturing Example 1

The hydroxyapatite is synthesised by mixing phosphoric acid with a composition comprising calcium hydroxide and calcium carbonate previously dispersed in a suitable quantity of water.

The reaction requires about 12 to 48 hours, more particularly about 15 to 30 hours.

Following the suspension of microcrystals a solution of sulfate (II) pentahydrate and copper chloride is added, previously dissolved in a suitable quantity of water.

Once these two solutions are combined, they are mixed to allow adsorption of copper ions in the inorganic crystals of hydroxyapatite.

The adsorption of the copper solution takes about 12 to 72 hours, more particularly from 24 to 60 hours.

Manufacturing Example 2

The hydroxyapatite is synthesised by mixing phosphoric acid with a composition comprising calcium hydroxide and calcium carbonate, previously dispersed in a suitable quantity of water.

The reaction requires about 12 to 48 hours, more particularly about 15 to 30 hours. Following the suspension of microcrystals, a suspension of sulphur and micronized sulphur dispersed in a suitable volume of water is added.

Once these two solutions are combined, they are mixed to allow adsorption of sulphur ions in the inorganic crystals of hydroxyapatite.

The reaction requires about 2 to 10 hours, more particularly about 4 to 6 hours.

Manufacturing Example 3

The hydroxyapatite is synthesised by mixing phosphoric acid with a composition comprising calcium hydroxide and calcium carbonate, previously dispersed in a suitable quantity of water.

The reaction requires about 12 to 48 hours, more particularly about 15 to 30 hours. Following the suspension of microcrystals, a suspension of essential oils dispersed in a suitable volume of water is added.

Once these two solutions are combined, they are mixed to allow adsorption of essential oils in the inorganic crystals of hydroxyapatite.

The reaction requires about 2 to 10 hours, more particularly about 4 to 6 hours.

Manufacturing Example 4

The hydroxyapatite is synthesised by mixing phosphoric acid with a composition comprising calcium hydroxide and calcium carbonate previously dispersed in a suitable quantity of water.

The reaction requires about 12 to 48 hours, more particularly about 15 to 30 hours.

Following the suspension of microcrystals a suspension of vegetal extracts such as extracts of mint, thyme, rosemary, cloves, cinnamon, lemon and garlic is added, previously dissolved in a suitable quantity of water.

Once these two solutions are combined, they are mixed to allow adsorption of vegetal extracts in the hydroxyapatite.

Manufacturing Example 5

The hydroxyapatite is synthesised by mixing phosphoric acid with a composition comprising calcium hydroxide and calcium carbonate, previously dispersed in a suitable quantity of water.

The reaction requires about 12 to 48 hours, more particularly about 15 to 30 hours. Following the suspension of microcrystals, a formulation of micro-elements such as boric acid and magnesium oxide dispersed in a suitable volume of water is added.

Once these two solutions are combined, they are mixed to allow adsorption of the metal ions in the hydroxyapatite.

The reaction requires about 2 to 10 hours, more particularly about 4 to 6 hours.

Manufacturing Example 6

The hydroxyapatite is synthesised by mixing phosphoric acid with a composition comprising calcium hydroxide and calcium carbonate, previously dispersed in a suitable quantity of water.

The reaction requires about 12 to 48 hours, more particularly about 15 to 30 hours. Following the suspension of microcrystals, a suspension of vegetal extracts such as the alcoholic or hydro alcoholic extract (in form of hygroscopic powder) of *Citrus paradisi, Loranthus europaeus, Medicago sativa* and *Solidago virgaurea*, is dispersed in a suitable volume of water is added.

Once these two solutions are combined, they are mixed to allow adsorption of the extracts in the hydroxyapatite.

The reaction requires about 2 to 10 hours, more particularly about 4 to 6 hours.

Composition Examples

A sulphur based composition may comprise the following formulation:
Sulphur hydroxyapatite 10% (carbonate hydroxyapatite with sulphur ions adsorbed thereto)
Distilled water 83%
Xanthan gum 1%
Glycerine 4%
Benzoic acid 2%

A copper based composition may comprise the following formulation:
Copper hydroxyapatite 10% (carbonate hydroxyapatite with copper ions adsorbed thereto)
Distilled water 83.5%
Xanthan gum 1%
Glycerine 4%
Benzoic acid 1.5%

A selenium based composition may comprise the following formulation:
Selenium hydroxyapatite 10% (carbonate hydroxyapatite with selenium ions adsorbed thereto)
Distilled water 83%
Xanthan gum 1%
Glycerine 4%
Benzoic acid 2%

A Boron based composition may comprise the following formulation:
Boron hydroxyapatite 10% (carbonate hydroxyapatite with boron ions adsorbed thereto)
Distilled water 83.5%
Xanthan gum 1%
Glycerine 4%
Benzoic acid 1.5%

A composition according to the invention may also be a composition comprising a mixture of the two compositions previously described.

A vegetal extract and copper based composition may comprise the following formulation:
Copper hydroxyapatite 10% (carbonate hydroxyapatite with copper ions adsorbed thereto)
hydroxyapatite loaded with essential oils 10%
Distilled water 73.5%
Xanthan gum 1%
Glycerine 4%
Benzoic acid 1.5%

Example of Use

In order to optimise the functional properties and structural stability of the liquid compositions comprising the hydroxyapatite particles, a use can be implemented according to the following recommendations in particular:
Shaking the composition before use to put the particles and/or aggregates of particles back in suspension in the composition;
Using an atomiser that ensures complete and uniform wetting of the vegetation and prevents too low or too high volumes;
Using quantities of water ranging from 60 L/ha to 250 L/ha on fully developed plants, avoiding excessive amounts of water which create run off;
Reducing the amount of product per hectare in the event of manual application;
Controlling the pH of the solution in water so that it is greater than 5.

Examples A

Experimental Tests on Vine Diseases

| LEGEND OF THE TESTED FORMULATIONS All the formulations contain water, hydroxyapatite substituted with carbonate ions and/or copper and/or zinc, and loaded with ions (K, Mg, B, Mn) and/or vegetal extracts. | |
|---|---|
| Code | Functional (F) or substituent (S) substances (g/kg formulation) |
| F1 | Cu = 50 (S); Zn (S) = 18; mix of vegetal extracts = 30 (F) |
| F10 | Cu = 50 (F); mix of vegetal extracts = 30 (F) |

1. Grapevine Yellows (Flavescence Dorée and Bois Noir)

To evaluate the action of the formulations against Flavescence dorée (FD), 3 different vineyards presenting the disease have been identified, in Piedmont, in the province of Cuneo (at farms Gaja and Ferrero) and Asti (at the farm Tenute dei Vallarino Gancia). For every single vineyard the severity of symptoms was recorded, indicating if it presented generalized symptoms (leaf symptoms on the entire foliage) or localized (symptoms on some branches); each symptomatic plant was marked with a special mark symbol.

In the vineyards chosen half of the vines were treated with F1 and the other half was kept as a comparison (Test). The symptomatic grapevines were treated individually in an alternating manner on the same row. The treatments were performed in the spring At the farm "A" (Cuneo), the trial began in 2014 by treating in post-harvest and the first analysis showed the presence of phytoplasma FD in 9 untreated plants and 0 treated and the presence of phytoplasma BN in 1 untreated plant and 0 treated plants (Table 2).

| Farm | Cv. | Year of plantation | Total surface | Nr. vines | Period Treatment | Type Treatment | Symptoms monitoring I | II | Treatments I | II | III |
|---|---|---|---|---|---|---|---|---|---|---|---|
| A | Arneis | 2008 | ha 0.50 | 89 | after harvest | single plant | 10 Oct. 2014 | | 11 Oct. 2014 | | |
| B | Barbera | 2003 | ha 1.00 | 124 | spring/ summer + after harvest | single plant | 30 Sep. 2013 | 12 Aug. 2014 | 4 Oct. 2013 | 12 Aug. 2014 | 23 Sep. 2014 |
| C | Barbera | 2005 | ha 0.50 | 95 | summer + after harvest | single plant | | | | 25 Jun. 2014 | 27 Oct. 2014 | and summer and in post harvest in the following ways:

At the farm "C" (Cuneo), leaf samples from 10 plants treated and 10 untreated plants (cv. Barbera) have been collected in October 2014 from the experimental vineyard, and tested in multiplex real-time RT-PCR for the presence of the phytoplasma Bois Noir (BN) and the FD. The analysis showed the presence of phytoplasma FD in 8 untreated plants and 0 treated. In 3 untreated vine the phytoplasma BN was found (Table 1).

TABLE 1

FARM B

| | | Multiplex Real Time RT-PCR | |
|---|---|---|---|
| No | SAMPLE | BN | FD |
| AT1 | No1 TREATED | neg | neg |
| AT2 | No1 UNTREATED | neg | neg |
| AT3 | No2 TREATED | neg | neg |
| AT4 | No2 UNTREATED | neg | pos |
| AT5 | No3 TREATED | neg | neg |
| AT6 | No3 UNTREATED | neg | neg |
| AT7 | No4 UNTREATED | neg | pos |
| AT8 | No4 TREATED | neg | neg |
| AT9 | No5 TREATED | neg | neg |
| AT10 | No5 UNTREATED | neg | pos |
| AT11 | No6 TREATED | neg | neg |
| AT12 | No6 UNTREATED | neg | pos |
| AT13 | No7 TREATED | neg | neg |
| AT14 | No7 UNTREATEDO | pos | pos |
| AT15 | No8 TREATED | neg | neg |
| AT16 | No8 UNTREATED | pos | pos |
| AT17 | No9 TREATEDO | neg | neg |
| AT18 | No9 UNTREATED | neg | pos |
| AT19 | No10 TREATED | neg | neg |
| AT20 | No10 UNTREATED | pos | pos |

TABLE 2

FARM C

| | | Multiplex Real Time RT-PCR | |
|---|---|---|---|
| No | SAMPLE | BN | FD |
| CN17 | No1 TREATED | neg | neg |
| CN18 | No1 UNTREATED | pos | pos |
| CN19 | No2 TREATED | neg | neg |
| CN20 | No2 UNTREATED | neg | pos |
| CN21 | No3 TREATED | neg | neg |
| CN22 | No3 UNTREATED | neg | pos |
| CN23 | No4 UNTREATED | neg | pos |
| CN24 | No4 TREATED | neg | neg |
| CN25 | No5 TREATED | neg | neg |
| CN26 | No5 UNTREATED | neg | neg |
| CN27 | No6 TREATED | neg | neg |
| CN28 | No6 UNTREATED | neg | pos |
| CN29 | No7 TTREATED | neg | neg |
| CN30 | No7 UNTREATEDO | neg | pos |
| CN31 | No8 TREATED | neg | neg |
| CN32 | No8 UNTREATED | neg | pos |
| CN33 | No9 TREATEDO | neg | neg |
| CN34 | No9 UNTREATED | neg | pos |
| CN35 | No10 TREATED | neg | neg |
| CN36 | No10 UNTREATED | neg | pos |

At the farm "B" (Asti), leaf samples from 10 plants were taken, in the experimental vineyard (cv. Barbera), in October 2014. The analysis showed the presence of phytoplasma FD in 8 untreated plants and 0 treated (Table 3).

TABLE 3

FARM A

| | | Multiplex Real Time RT-PCR | |
|---|---|---|---|
| No | SAMPLE | BN | FD |
| AA1 | No1 TREATED | neg | neg |
| AA2 | No1 UNTREATED | neg | pos |
| AA3 | No2 TREATED | neg | neg |
| AA4 | No2 UNTREATED | neg | pos |
| AA5 | No3 TREATED | neg | neg |
| AA6 | No3 UNTREATED | neg | pos |
| AA7 | No4 UNTREATED | neg | pos |
| AA8 | No4 TREATED | neg | neg |
| AA9 | No5 TREATED | neg | neg |
| AA10 | No5 UNTREATED | neg | pos |
| AA11 | No6 TREATED | neg | neg |
| AA12 | No6 UNTREATED | neg | pos |
| AA13 | No7 TREATED | neg | neg |
| AA14 | No7 UNTREATEDO | neg | pos |

TABLE 3-continued

FARM A

| | | Multiplex Real Time RT-PCR | |
|---|---|---|---|
| No | SAMPLE | BN | FD |
| AA15 | No8 TREATED | neg | neg |
| AA16 | No8 UNTREATED | neg | pos |
| AA17 | No9 TREATEDO | neg | neg |
| AA18 | No9 UNTREATED | neg | neg |
| AA19 | No10 TREATED | neg | neg |
| AA20 | No10 UNTREATED | neg | neg |

Furthers analysis of 13 leaf samples, taken from 10 plants in vineyards "test out", in which treatments were made equally with the formulation F1. Samples were identified, in the same branch, as "symptomatic leaves" and "asymptomatic leaves" (issued at the apex after treatment). Only symptomatic leaves were positive to FD.

At the same time, tests in a controlled environment (greenhouse) were set to evaluate and compare the efficacy of the formulation F1 and F10 by treating plants of *Catharanthus roseus*, artificially infected with different agents of Grapevine Yellows.

The plants were grown for three months to reach an appropriate development stage to ensure the efficacy of the inoculum, which was performed by coupling portions of herbaceous plant with infected agents: Stolbur or Bois Noir (16SrXII-A), Aster Yellows (16Srl-B) and Flavescence dorée (16SrV-C).

The tests in the greenhouse, were 3:
1—Products F1 and F10 on plants infected with the phytoplasma Stolbur (16SrXII-A);
2—Products F1 and F10 on plants infected with Aster Yellows phytoplasma (16Srl-B);
3—Product F10 on plants infected with the phytoplasma Flavescence dorée (16SrV-C).

For the tests were used: 15 plants infected with the phytoplasma and untreated, 15 plants infected with the phytoplasma and treated F1, 15 plants infected with the phytoplasma and treated with F10, 15 healthy plants treated with F1 and 15 healthy plants treated with F10.

Treatments are initiated after 1 month after inoculation, following the full manifestation of the symptoms, initially at a concentration of 6.6 g/l (0.6%) every 9 days and subsequently of 50 g/l (5%) every two weeks. Below the results of the symptoms monitoring:

| | Dead vines | Growing vines | Asymptomatic leaves |
|---|---|---|---|
| FD | | | |
| Control | 81% | 19% | 0% |
| F10 | 15% | 63% | 22% |
| FI | 13% | 61% | 26% |
| BN | | | |
| Control | 81% | 19% | 0% |
| F10 | 14% | 66% | 20% |
| FI | 11% | 70% | 19% |
| AY/FI | | | |
| Control | 89% | 11% | 0% |
| F10 | 8% | 61% | 31% |
| FI | 7% | 60% | 33% |

The treatments confirmed the reduction of the symptoms expression in plants affected with Grapevine Yellows, revealing the similar efficacy of the formulations F1 and F10 in comparison with each control.

Examples B

Experimental Tests on Vine Diseases

| LEGEND OF THE TESTED FORMULATIONS All the formulations contain water, hydroxyapatite substituted with carbonate ions and/or copper and/or zinc, and loaded with ions (K, Mg, B, Mn) and/or vegetal extracts. | |
|---|---|
| Code | Functional (F) or substituent (S) substances (g/kg formulation) |
| T1 | Cu [sulphate] = 35 (F); Zn (F) = 18; mix of vegetal extracts = 30 (F) |
| T2 | Cu [sulphate tribasic] = 35 (F); Zn (F) = 18; mix of vegetal extracts = 30 (F) |
| T3 | Cu [oxychloride] = 35 (F); Zn (F) = 18; mix of vegetal extracts = 30 (F) |
| T4 | Cu [hydroxide] = 35 (F); Zn (F) = 18; mix of vegetal extracts = 30 (F) |
| MS | Hydroxyapatite substituted with carbonate ions = 120 |
| OE1 | mix of vegetal extracts = 30 (F) |
| OE2 | mix of vegetal extracts = 30 (F) |

1. Introduction

Several formulations based on hydroxyapatite substituted with carbonate ions and/or copper and/or zinc, and loaded with vegetal extracts were tested in vitro and in vivo against grapevine pathogens.

2. ESCA or Grapevine Trunk Disease

Samples constituted of water and based on Carbonate Hydroxyapatite (HCA) loaded with several copper salt (sulphate, tribasic sulphate, oxychloride, hydroxide), zinc sulphate and vegetal extracts (essential oils) were tested in vitro against the pathogens related to esca: *Phaeomoniella chlamydospora, Phaeoacremonium aleophilum*.

The protocol consisted on the pathogens growth in a proper media (MEA—Malt Extract Agar) as untreated sample, and the same media with 4 different concentrations of the testing agents, 0.6%, 1.2%, 2.4% and 4.8.

The fungal growth was measured, in the diametrical direction, from the inoculation point. The measurement was expressed in mm. Growth difference of *Phaeoacremonium aleophilum* and *Phaeomoniella chlamydospora* were observed every 7 days for four weeks (then at 7, 14, 21 and 28 days).

Subtracting to the values, the diametric value 0.7 mm, corresponding to the initial inoculum, it was determined the actual growth of the colony; however, the effectiveness of the single product was calculated observing (Moghaddam et al, 2014) the percentage of growth inhibition compared to the control (abbreviated % IG), by the formula:

$$\% \text{ IG} = [\text{Growth value inoculated sample} - \text{Growth value control}]/\text{Growth value control}$$

In order to improve the information on the data relating to the effect of these treatments were subjected to analysis of variance (ANOVA) and the significance of the differences between the averages of the treatments was tested by the Tukey's HSD Test. The package used for the Statistical analysis of the results was 10 version developed by StatSoft. Inc., Tulsa, Okla. 74104 USA.

Results ESCA (*Phaeomoniella chlamydospora*)—FIGS. 1A-D

All the plates treated with MS are not inhibited but rather it is observed a strong probiotic action that reaches the maximum at the first control with values that, for the very high concentrations, can reach values higher than 50%. The effectiveness in the inhibition of *P. chlamydospora* by T1 is observable fine immediately, in fact it has the 100% inhibition for each concentration. At day 28 none of the plates under test had produced mycelium thus maintaining unaltered the values for all the time of the test. The inhibition effect T2 is observable from the first day to seven days of all concentrations, which reach the maximum of efficiency at the second day, until the end of the test, to descend. For the treatment T3 it is observed that the inhibitory effect is not present. For the treatment T4 it is observed, from the first control to seven days a significant inhibition effect for the highest concentration, 4.8%, reaches 100%. The treatment OE1 show a different trend resulting not inhibitory to the higher concentration, but it is inhibitor after 14 days from the beginning of the test. Also the treatment OE2 shows a low inhibitory effect: there is a statistically significant difference only at the end of the test on the higher concentrations.

Results ESCA (*Phaeoacremonium aleophilum*)—FIGS. 2A-D

The treatment MS showed, already at the first observation, a probiotic effect on the fungus, especially for the two lowest concentrations that demonstrate statistically detectable differences between them. Comparing with the previous result, in this case, the treatment T1 have an inhibition effect but inconstant for the duration of the test and for all concentrations. For the treatment T2, it is observed that the highest concentrations, 4.8% and 2.4%, have an inhibiting effect on the growth of the fungus already at the first control after 7 days that for the 4.8% concentration is 98%. As reported in the previous pathogen, the treatment T3 showed a probiotic effect on *P. aleophilum*. With the same trend, the treatment OE1 has a probiotic effect on growth of the fungus which reaches its maximum at day 21, up to values higher than 100%. While for the treatment OE2 it is observed that the inhibition of 100% of the fungus begins already at day 7 for all the concentrations and maintains unchanged for the whole time of the test. In the treatment T4, the concentration 4.8%, is for all the time of trial, inhibitory against the fungus reaching a percentage greater than 70% which remains constant in time.

3. Grapevine Crown Gall Agent (*Agrobacterium vitis*)

The biological efficacy of the test agents was determined on the infection control of *Agrobacterium vitis* in grapevine propagating material (rootstocks) in the nursery. To this aim, 400 scions of Glera ISV 19 (non-infected) and 400 cuttings 41B E12 (naturally infected by the pathogen) were divided into four experimental thesis, each designed to produce 100 grafted cuttings, treated with different concentrations of T1 (1 and 2%), according to the following scheme:

| Thesis | Cuttings | pre-hydration | hydration | post-hydration | post-grafting |
|---|---|---|---|---|---|
| NT | 100 | — | 7 h in water | — | — |
| T1/1 | 100 | — | 7 h in water | — | 1 h in T1 2% |
| T1/2 | 100 | 10 min in T1 2% | 7 h in water | 10 min in T1 2% | 10 min in T1 2% |
| T1/3 | 100 | — | 7 h in T1 1% | — | 10 min in T1 1% |

The treatment was performed on rootstocks of 4 experimental thesis, in 25 L of water. The following day the grafts and the first waxing have been performed. In all stages of processing the four thesis on trial have been kept separate and grafting machines have been disinfected with 3% sodium hypochlorite, both at the beginning and at the end of the experimental grafts.

The field surveys concerning the yield and the symptoms (cancer at the level of grafting point) were carried out 3 times along the growing season.

The presence of the pathogen was monitored by molecular analysis in two stages: before treatment, of rootstocks and scions and at the end of the callusing in grafted cuttings. The diagnosis was conducted by microbiological analysis in semi-selective agar substrate then confirmed by molecular technique with Multiplex PCR (Bini et al. 2008).

Data on yields in nursery of the grafted cuttings and their contamination by the pathogen were subjected to analysis of variance (ANOVA) and comparison of means with S.N.K tests. In the tables and graphs, the same letters correspond non statistically different means (P<0.05). Statistical analysis was performed using the software CoStat 6400 (Cohort Software).

Results Grapevine Crown Gall Agent (*Agrobacterium vitis*)

Figure 3:
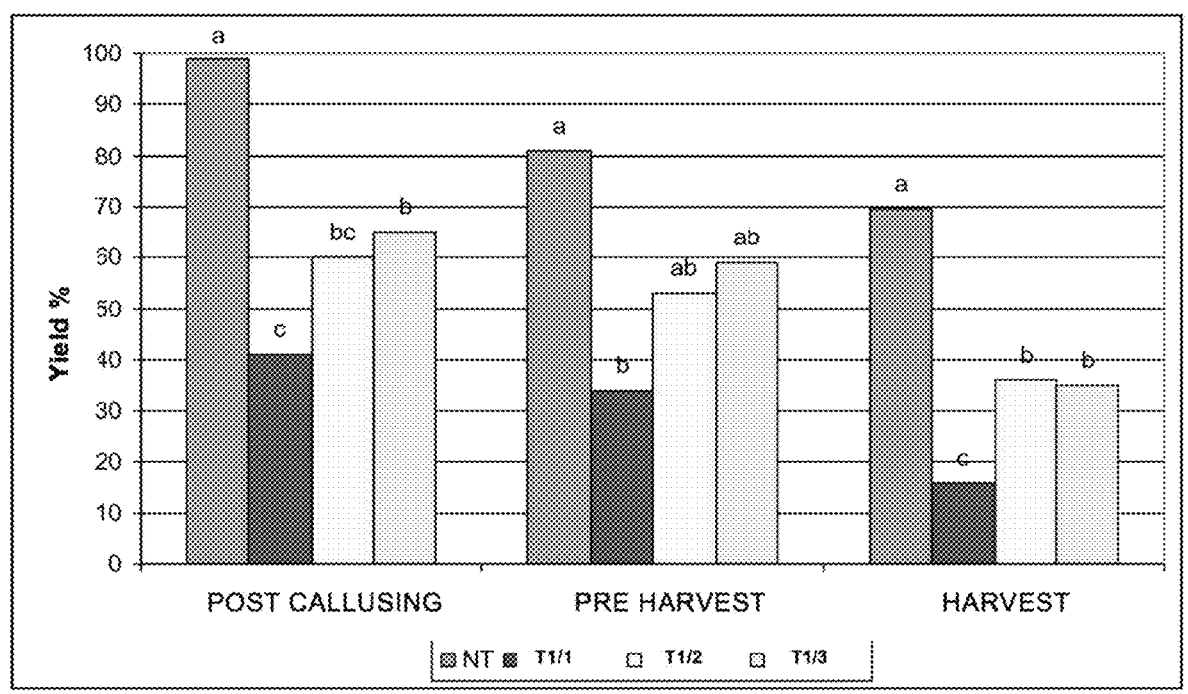

FIG. 3 provides a graphical representation of the performance of the nursery material data subjected to experimental treatment with the agent T1, in the three different employment strategies, in three stages, respectively, in post-callusing, pre-harvest and the harvest. On the untreated (NT) is observed a final yield of 70%, in line with the normal yields of nursery, considering that the material is mostly infected. The three of T1 treatments have led to variable reductions in yield in the nursery, compared to the untreated control, with different percentages depending on the production phase.

Before harvest, the three T1 treatments showed acceptable yields (53 and 59% of alive plants, respectively), slightly lower than the untreated control.

Figure 4:
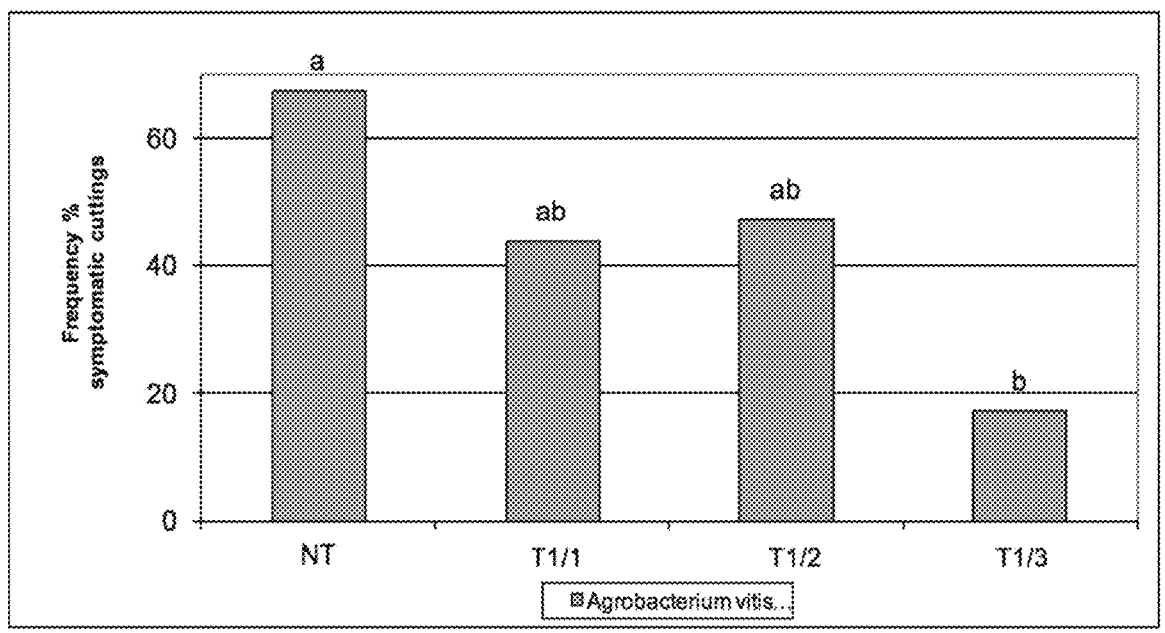

The grafted vines at the harvest were subjected to control, not only of the vitality to evaluate the final yield, but also the presence of obvious symptoms of the disease, consisting of tumours at the level of the coupling point, in the rootstock and in the scions. FIG. 4 provides a graphical representation of the relative frequency of symptomatic cuttings at the harvest, under the three different strategies of use of T1, in comparison with the untreated control. The presence of symptoms in the untreated control was very high: in fact 67% of the cuttings presented tumours, mainly in the rootstock. The theses T1/1 and T1/2 showed a similar behaviour, with basically a smaller presence of symptoms compared to control, respectively, in 44 and in 47% of plants. The cuttings treated with T1/3 have instead highlighted the smaller presence percentage of symptoms, 17%, confirmed by the statistical test.

Figure 5:
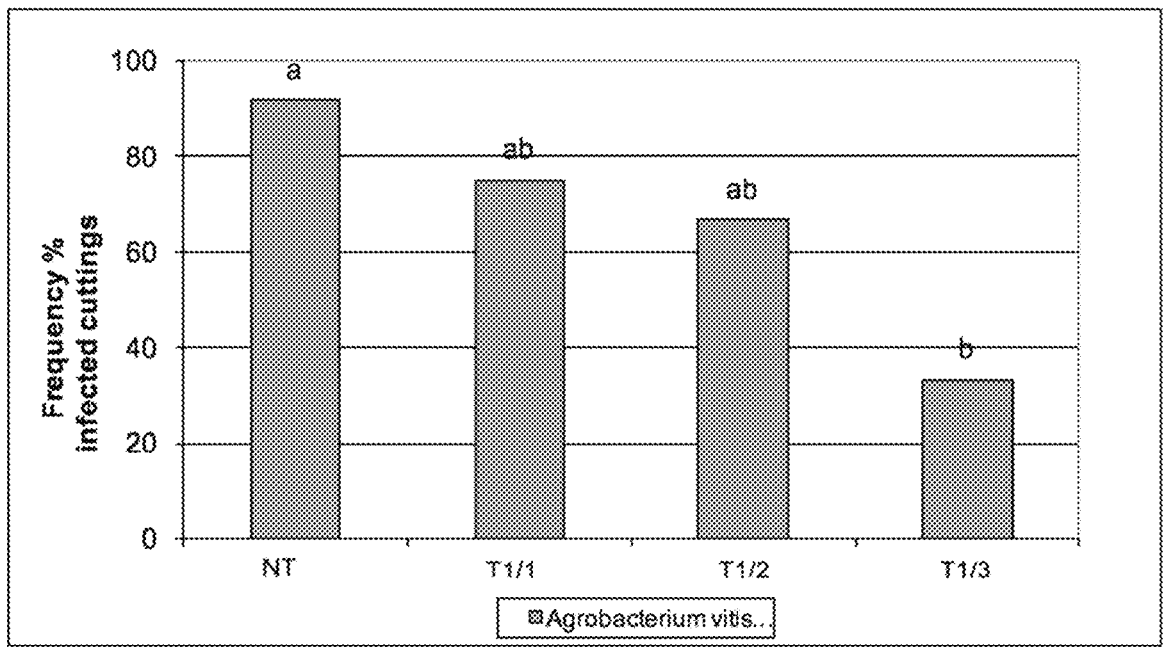
FIG. 5 show the results (frequency of pathogen strain) of the nursery test on *Agrobacterium vitis*.

FIG. 5 shows, for each thesis, the molecular analysis carried out to highlight the presence of tumorigenic strains of *Agrobacterium vitis*: in all three experimental thesis it was lower than in the untreated control. The thesis T1/3, in particular, has led to a considerable reduction of the pathogen, showing a reduction of about 65% compared to the untreated control.

Considering globally the data of the three treatments, regarding the effectiveness in breaking the pathogen, the highest yield and the reduction of symptoms to the harvest was achieved by the thesis T3/3, which has proven to be the best compromise for yield and efficacy.

4. Grapevine Yellows (Flavescence Dorée/Flavescenza Dorata)

To evaluate the action of the formulations against Flavescence doréellFlavescenza dorata (FD), 5 similar vineyards (cv. Barbera) presenting the disease have been identified, in Piedmont, in the province of Cuneo.

For every single vineyard the severity of the disease was recorded in terms of dead vines per hectare. The first survey was carried out in August 2011 until August 2014. The treatments started in post-harvest 2011, applying the following protocol based on the grapevine phenological growth stages:
1) BBCH 91 (October—Post-harvest)
2) BBCH 14 (May)
3) BBCH 71 (June)
4) BBCH 77 (July)
5) BBCH 81 (August)*
*treatment followed by the annual vineyard survey.

In each treatment it was applied 2 l/ha of the agent T1, using the traditional sprayer for vineyard and an average of 300-400 l/ha of water.
Results Grapevine Yellows (Flavecence Dorée/Flavescenza dorata)

Figure 6:
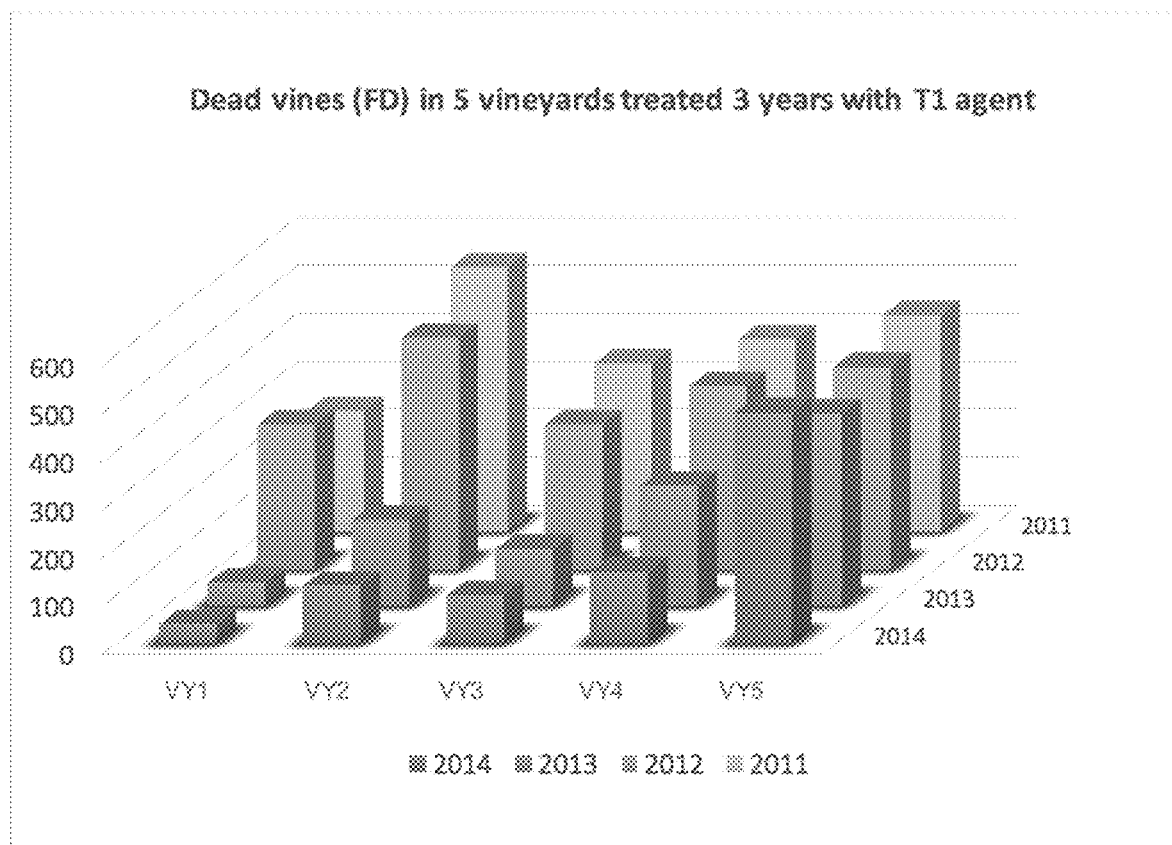
FIG. 6 show the results (dead vines) of the field test on Flavescence dorée.

The FIG. 6 illustrate the number/ha of dead vine in the 5 treated vineyards. Data referred to 2011 represent the initial state of the vineyards before to apply the agent T1. The following scheme reports the same data:

|  | 2011 | 2012 | 2013 | 2014 |
| --- | --- | --- | --- | --- |
| VINEYARD 1 | 250 | 300 | 50 | 40 |
| VINEYARD 2 | 550 | 480 | 180 | 120 |
| VINEYARD 3 | 350 | 300 | 120 | 100 |
| VINEYARD 4 | 400 | 380 | 250 | 150 |
| VINEYARD 5 | 450 | 420 | 400 | 480 |

Globally in all the vineyards, it was recorded a positive and significantly reduction, by the years, of the number of dead vines caused by FD. The opposite tendency showed between 2011 and 2012 in the vineyard 1 and between 2013 and 2014 in the vineyard 5 was explained by the over exposure of the vineyard to an extraordinary presence of the *Scaphoisus titanus*, the insect vector of FD.

The results confirmed the positive effect of the treatments with the agent T1 on reducing the grapevine decay related to grapevine yellows (FD) in the selected vineyards.

5. Olive Quick Decline Syndrome (*Xylella fastidiosa*)

As described by Martelli (2013), the olive quick decline syndrome (OQDS) is a disease that appeared suddenly a few years ago in the province of Lecce, Salento peninsula (south-eastern Italy). The major incitant of the disease is *Xylella fastidiosa*, a quarantine pathogen of American origin whose unwelcome introduction in the area has created much disturbance because: (i) the dramatic damage suffered by the olive groves where the pathogen has established itself; (ii) the alarm that this finding has raised in a country (Italy) whose olive/oil industry is a primary asset, and in the European Union, which is facing the first confirmed record in its territory of this alien and much feared microorganism.

OQDS is characterized by the presence of leaf scorching and desiccation of twigs and small branches, that prevail first in the upper part of the canopy then extend to the rest of the crown, which acquires a burned look. The more seriously affected plants are heavily pruned by the growers to favour new growth which, however, is scanty and desiccates in a short while. The skeletal-looking trees push a multitude of suckers from the base and survive for some time, i.e. as long as the roots are viable.

The aim of the trial was to verify in a first preliminary year, the efficacy of the agent T1, on contrasting the development of the OQDS symptoms, caused by *Xylella fastidiosa*. The test was carried out on olive trees in an experimental field under the responsibility and supervision of the C.I.H.E.A.M.—IAMB (Istituto Agronomico Mediterraneo of Bari), authorised by the Italian Ministry of Agriculture to conduct field trials on OQDS. Olive grove of about 30 years of age (cv. Ogliarola Salento), with symptoms of OQDS was selected. The scheme of the test was characterized by four randomized blocks where each block was composed of four trees, the blocks of the treated plants were alternated with untreated in two rows separated by two rows of untreated plants.

The test had a duration of nine months beginning in April and ending in December, they were carried out with 6 treatments, 4 fertilizations and 8 surveys of the symptomatology associated with the OQDS. The plants were treated with a sprayer (mod. LIBICCI of Tecnopress) equipped with a distribution nozzle, applying 0.5% (v/v) of the agent T1 for the first 4 application and 0.75% for the last 2 application:
1) May, 4
2) June, 3
3) July, 3
4) August, 4
5) November
6) November The test was carried out with an experimental scheme to 'randomized' blocks with 4 repetitions (4 plants/each) see FIG. 7, for a total of 32 plants in addition to 12 plants with obvious manifestation of symptoms (dead plants). For static analysis ANOVA was used.

Visual observations were made on a monthly basis and have covered the degree of progress of symptoms associated with OQDS based on an empirical scale of severity of symptoms.
0=no foliar symptoms
1=1-5% of the foliage with dead branches
2=6-10% of the foliage with dead branches
3=11-25% of the foliage with dead branches
4=more than 25% of the foliage with dead branches
Results Olive Quick Decline Syndrome (*Xylella fastidiosa*)

Figure 7:
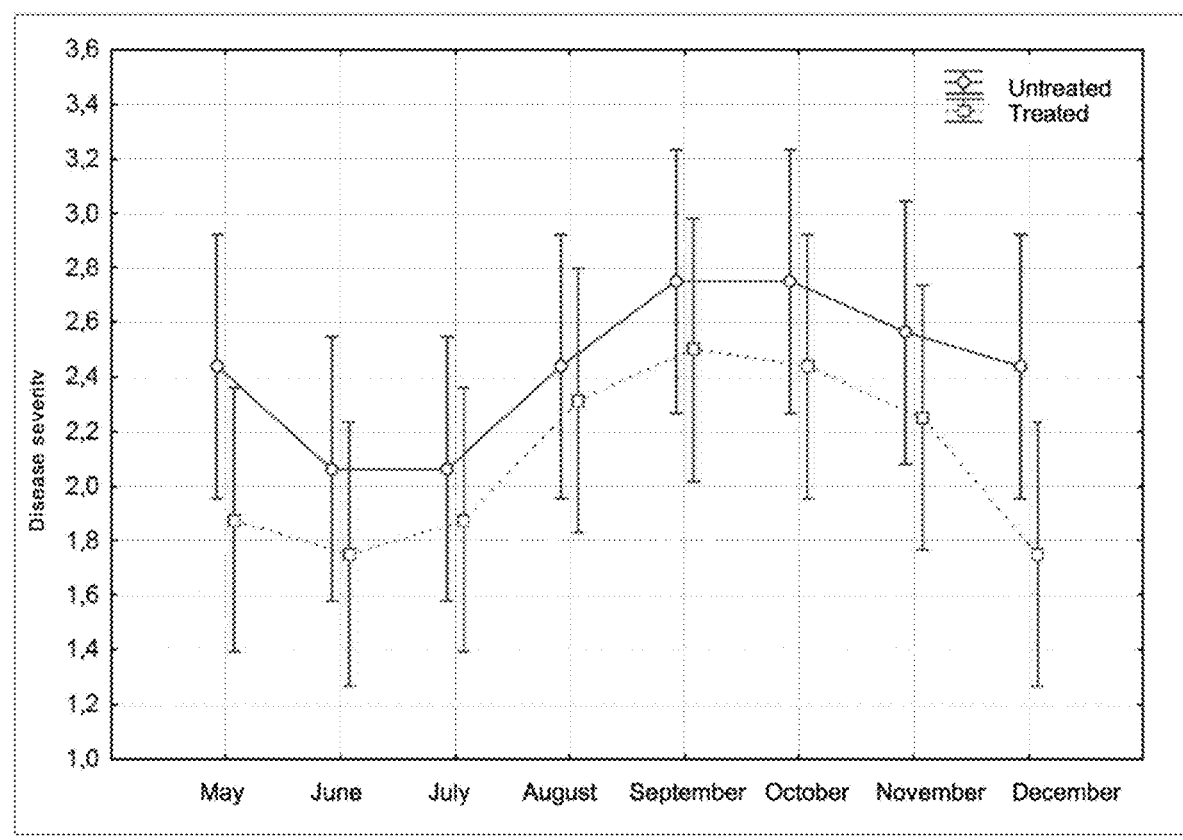
FIG. 7 show the disease severity in the field trial on OQDS (*Xylella fastidiosa*).

The course of the disease (OQDS), assessed according to the empirical scale reported, it has not given the statistical differences of the treated plants compared with those untreated. Nevertheless, looking at the FIG. 7, red line shows the degree of the disease in treated plants: the lower value indicates a degree of "health" best plant. As it's shown, at the end of the trial (December) plants treated were given a lower value as the degree of symptoms of OQDS, indicating an initial improvement of the plants (FIG. 7).

Figure 8:
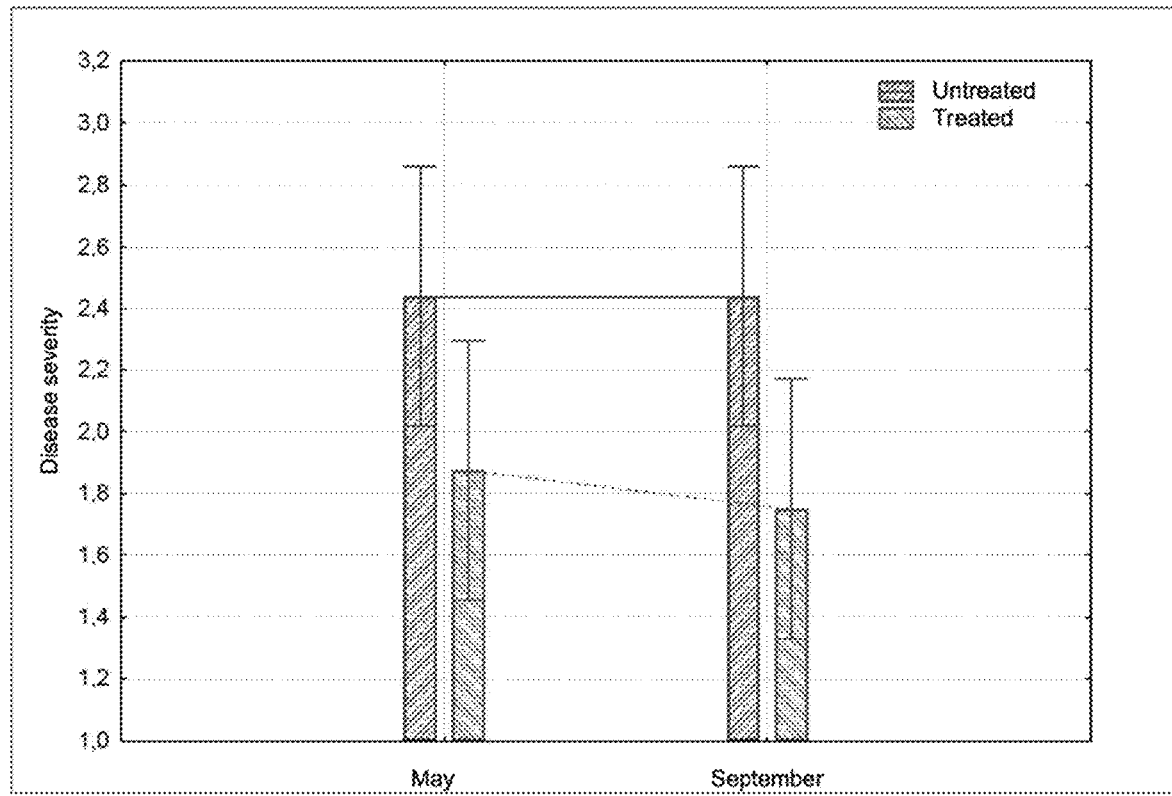
FIG. 8 show the differences of disease severity in the field trial on OQDS (*Xylella fastidiosa*).

In FIG. 8, the evaluation of the degree of the disease is shown (OQDS) from the beginning and the end of the test: it is observed that the untreated plants did not have a variation in the development of disease symptoms, but the treated plants showed a reduction, indicating the beginning of the process of plant improvement (FIG. 8). Considering the olive tree, which does not have an immediate response to treatment and in consideration of the complexity of the disease that is articulated with various associated pathogens, the results were very promising to achieve a better improvement of the health status of the plant in the next 2 years of field application of the same treatment, following at least the same timing in which significant results were collected against other plant diseases.

6. Bacterial Canker in Kiwifruit (*Pseudomonas syringae* pv. actinidiae)

*Pseudomonas syringae* pv. actinidiae is particularly dangerous on kiwifruit, being responsible of a canker development that cause the plant death. At present, to control this bacterial pathogen, especially in organic agriculture, few effective strategies can be adopted. Copper treatments and appropriate agronomical practices, such as seeds certification, irrigation and fertilization, are suggested (Colin et al., 1984; Varvaro et al., 2001).

Due to the recent EU restriction on copper use in organic agriculture and the increased movement of vegetal material among the EU and not EU countries, the possibility to limit the application of copper based control agents and the amplification of their efficacy assume a relevant importance to control these bacterial pathogens especially in organic agriculture.

To this aim, an in vitro study was designed to evaluate the efficacy of the agents T1 and T2 on the control of *Pseudomonas syringae* pv. actinidiae.

In in vitro tests were carried out by the test with active ingredient included in the culture medium which simulates the reaction of the pathogen to grow on a surface treated with the test agent.

A mix obtained with 50% of T1 and 50% of T2 was utilised at the following concentration: 0.5-1-2-3-4-5-6-7-8 g/l (9 doses). The control agent was included in the NSA medium (nutrient broth 8 g/l, sucrose 50 g/l and agar 18 g/l), which was then poured in Petri dishes and left to solidify.

Bacterial strains, characterized by a higher level of virulence and isolated from kiwifruit plants in Central Italy, were utilised at the concentration of $10^6$ cfu/ml.

The bacterial suspension was placed on NSA Petri dishes (100 µl per Petri dish) and after incubation at 26° C. for 48 h, any bacterial growth was measured in mm, observing the Petri dishes by a stereomicroscope. In vitro test was carried out under laboratory conditions.

Results Bacterial Canker in Kiwifruit (*Pseudomonas syringae* pv. Actinidiae)

In in vitro test, the testing agent inhibits the growth of the bacterial strain utilised. The inhibition started to appear at concentrations major and equal of 2 g/l: the 7 effective concentrations inhibited totally the bacterial strain. No inhibition resulted by the lower concentrations (0.5 and 1 g/l).

The untreated NSA medium allowed a good growth of the bacterial strain, confirming the test validity.

The control agents T1 and T2 seem to be useful for a *Pseudomonas syringae* pv. actinidiae bacterial pathogens.

The use of these substances appear to be particularly interesting to be applied in the field for protective treatments of kiwifruit, due to the low content of copper. The antimicrobial activity of the vegetal extracts reserves interesting opportunities to substitute or to be associated to copper amount lower than what is normally used in organic agriculture.

EXPERIMENTAL SECTION II—INHIBITION TESTS (DILUTION METHOD) WITH *XANTHOMONAS AXONOPODIS* PV. CITRI

Within the framework of the present description and in the subsequent claims, except where otherwise indicated, all the numerical entities expressing amounts, parameters, percentages, and so forth, are to be understood as being preceded in all instances by the term "about".

Example 1

Preparation of Carbonate Substituted Hydroxyapatite (CHA)

The carbonate substituted hydroxyapatite was prepared by mixing 225 g of an aqueous solution of phosphoric acid (obtained from 130 g of phosphoric acid 75% (% w/w) and 96 g of water) and 805 g of a mixture formed by calcium hydroxide (125 g) and calcium carbonate (15 g) previously dispersed in 670 g of water. The mixture was maintained at room temperature for 11 hrs, obtaining a suspension containing 16% (w/w) of carbonate substituted hydroxyapatite (CHA).

Example 2

Preparation of Carbonate Substituted Hydroxyapatite (CHA) Loaded with 20% of Copper Ions A suspensions was prepared from 20% (% w/w) of the aqueous suspensions of CHA as in Example 1 and 4% (% w/w) of 29% (% w/w) aqueous suspension of tribasic copper sulfate ($Cu_4SO_4(OH)_6 \cdot \frac{1}{2}H_2O$) was added. The total suspension was stirred for 15 minutes. The total amount of copper expressed as copper ion was 20% (% w/w) of CHA. Water was then added up to 100% of the total weight, and the suspension stirred for further 10 minutes.

Example 3

Preparation of Carbonate Substituted Hydroxyapatite (CHA) Loaded with 80% of Copper Ions A suspensions was prepared from 20% (% w/w) of the aqueous suspensions of CHA as in Example 1 and 16% (% w/w) of 29% (% w/w) aqueous suspension of tribasic copper sulfate ($Cu_4SO_4(OH)_6 \cdot \frac{1}{2}H_2O$) was added. The total suspension was stirred for 15 minutes. The total amount of copper expressed as copper ion was 80% (% w/w) of CHA. Water was then added up to 100% of the total weight, and the suspension stirred for further 10 minutes.

Example 4

Preparation of Carbonate Substituted Hydroxyapatite (CHA) Loaded with 5% of Zinc Ions A suspensions was prepared from 20% (% w/w) of the aqueous suspensions of CHA as in Example 1 and 9% (% w/w) of 5% (% w/w) aqueous solution of zinc sulfate monohydrate was added. The total suspension was stirred for 15 minutes. The total amount of zinc expressed as zinc ion was 5% (% w/w) of CHA. Water was then added up to 100% of the total weight and the suspension stirred for further 10 minutes.

Example 5

Preparation of Carbonate Substituted Hydroxyapatite (CHA) Loaded with 30% of Zinc Ions A suspensions was prepared from 20% (% w/w) of the aqueous suspensions of CHA as in Example 1 and 54% (% w/w) of 5% (% w/w) aqueous solution of zinc sulfate monohydrate was added. The total suspension was stirred for 15 minutes. The total amount of zinc expressed as zinc ion was 30% (% w/w) of CHA. Water was then added up to 100% of the total weight and the suspension stirred for further 10 minutes.

Example 6

Preparation of Carbonate Substituted Hydroxyapatite (CHA) Loaded with 80% of Copper Ions and 5% of Zinc Ions A suspensions was prepared from 20% (% w/w) of the aqueous suspensions of CHA as in Example 1, 16% (% w/w) of 29% (% w/w) aqueous suspension of tribasic copper sulfate ($Cu_4SO_4(OH)_6 \cdot \frac{1}{2}H_2O$) and 9% (% w/w) of 5% (% w/w) aqueous solution of zinc sulfate monohydrate were added. The total suspension was stirred for 15 minutes. The total amount of copper expressed as copper ion was 80% (% w/w) of the CHA and the total amount of zinc expressed as zinc ion was 5% (% w/w) of CHA. Water was then added up to 100% of the total weight, and the suspension stirred for further 10 minutes Example 7

Preparation of Carbonate Substituted Hydroxyapatite (CHA) Loaded with 20% of Copper Ions and 30% of Zinc Ions A suspensions was prepared from 20% (% w/w) of the aqueous suspensions of CHA as in Example 1, 4% (% w/w) of 29% (% w/w) aqueous suspension of tribasic copper sulfate ($Cu_4SO_4(OH)_6 \cdot \frac{1}{2}H_2O$) and 54% (% w/w) of 5% (% w/w) aqueous solution of zinc sulfate monohydrate were added. The total suspension was stirred for 15 minutes. The total amount of copper expressed as copper ion was 20% (% w/w) of the substituted carbonate hydroxyapatite and the total amount of zinc expressed as zinc ion was 30% (% w/w) of CHA. Water was then added up to 100% of the total weight, and the suspension stirred for further 10 minutes.

Example 8

Preparation of Carbonate Substituted Hydroxyapatite (CHA) Loaded with 50% of Extract 1 (Consisting of a Mixture of Vegetal Extracts as in Table 1) 6.4 g of Extract 1 (as in Table 1) was dissolved in 50 ml of a hydroalcoholic mixture (4:1 v/v) and 20% (% w/w) of the mixture was added to 20% aqueous suspension of CHA as in Example 1. The total suspension was stirred for 15 minutes. The total amount of Extract 1 was 50% (% w/w) of CHA. Water was then added up to 100% of the total weight, and the suspension stirred for further 10 minutes.

Example 9

Preparation of Carbonate Substituted Hydroxyapatite (CHA) Loaded with 1% of Extract 1 (Consisting of a Mixture of Vegetal Extracts as in Table 1)

6.4 g of Extract 1 (as in Table 1) was dissolved in 50 ml of a hydroalcoholic mixture (4:1 v/v) and 0.25% (% w/w) of the mixture was added to 20% aqueous suspension of CHA as in Example 1. The total suspension was stirred for 15 minutes. The total amount of Extract 1 was 1% (% w/w) of CHA. Water was then added up to 100% of the total weight, and the suspension stirred for further 10 minutes Examples 10-17

Preparation of Carbonate Substituted Hydroxyapatite (CHA) Loaded with 50% and 1% of Extract 2, 3, 4, 5 (Consisting of a Mixture of Vegetal Extracts as in Table 1)

Following the procedure reported in Example 8 and 9, but by using the same amounts of appropriate Extracts 2, 3, 4 and 5 (as indicated in Table 1) and of 20% aqueous suspension of CHA as in Example 1 the following suspension were prepared:

| Example | Extract | CHA % in total suspension | Extract % in respect to CHA in total suspension |
|---|---|---|---|
| 10 | 2 | 3.2 | 50 |
| 11 | 2 | 3.2 | 1 |

-continued

| Example | Extract | CHA % in total suspension | Extract % in respect to CHA in total suspension |
|---|---|---|---|
| 12 | 3 | 3.2 | 50 |
| 13 | 3 | 3.2 | 1 |
| 14 | 4 | 3.2 | 50 |
| 15 | 4 | 3.2 | 1 |
| 16 | 5 | 3.2 | 50 |
| 17 | 5 | 3.2 | 1 |

Example 18

Preparation of Carbonate Substituted Hydroxyapatite (CHA) Loaded with 50% of Extract 1 (Consisting of a Mixture of Vegetal Extracts as in Table 1) and 5% of Zinc Ions 6.4 g of Extract 1 (as in Table 1) was dissolved in 50 ml of a hydroalcoholic mixture (4:1 v/v) and 20% (% w/w) of the mixture was added to 20% aqueous suspension of CHA as in Example 1. Then 9% (% w/w) of 5% (% w/w) aqueous solution of zinc sulfate monohydrate was added. The total suspension was stirred for 15 minutes. The total amount of Extract 1 was 50% (% w/w) of CHA and the total amount of zinc expressed as zinc ion was 5% (% w/w) of CHA. Water was then added up to 100% of the total weight and the suspension stirred for further 10 minutes.

Example 19

Preparation of Carbonate Substituted Hydroxyapatite (CHA) Loaded with 1% of Extract 1 (Consisting of a Mixture of Vegetal Extracts as in Table 1) and 30% of Zinc Ions 6.4 g of Extract 1 (as in Table 1) was dissolved in 50 ml of a hydroalcoholic mixture (4:1 v/v) and 0.25% (% w/w) of the mixture was added to 20% aqueous suspension of CHA as in Example 1. Then 54% (% w/w) of 5% (% w/w) aqueous solution of zinc sulfate monohydrate was added. The total suspension was stirred for 15 minutes. The total amount of Extract 1 was 1% (% w/w) of CHA and the total amount of zinc expressed as zinc ion was 30% (% w/w) of CHA. Water was then added up to 100% of the total weight and the suspension stirred for further 10 minutes.

Examples 20-41

Preparation of Carbonate Substituted Hydroxyapatite (CHA) Loaded with 50% and 1% of Extracts 2, 3, 4, 5 (Consisting of a Mixture of Vegetal Extracts as in Table 1), with 5% and 30% of Zinc Ions or with 20% and 80% of Copper Ions or in Combination with Zinc and Copper Ions in Different Concentration Ranges Following the procedure reported in Example 18 and 19, but by using the appropriate amounts of Extracts 2, 3, 4 and 5 (as in Table 1), 20% aqueous suspension of CHA as in Example 1 and the appropriate % of the copper and zinc salts as indicated in the previous example, the following suspensions were prepared:

| Example | Extract | CHA % in total suspension | Extract % in respect to CHA in total suspension | Copper ion % in respect to CHA in total suspension | Zinc ion % in respect to CHA in total suspension |
|---|---|---|---|---|---|
| 20 | 2 | 3.2 | 50 | 0 | 5 |
| 21 | 2 | 3.2 | 1 | 0 | 30 |
| 22 | 3 | 3.2 | 50 | 0 | 5 |
| 23 | 3 | 3.2 | 1 | 0 | 30 |
| 24 | 4 | 3.2 | 50 | 0 | 5 |
| 25 | 4 | 3.2 | 1 | 0 | 30 |
| 26 | 5 | 3.2 | 50 | 0 | 5 |
| 27 | 5 | 3.2 | 1 | 0 | 30 |
| 28 | 1 | 3.2 | 50 | 20 | 0 |
| 29 | 1 | 3.2 | 1 | 80 | 0 |
| 30 | 2 | 3.2 | 50 | 20 | 0 |
| 31 | 2 | 3.2 | 1 | 80 | 0 |
| 32 | 3 | 3.2 | 50 | 20 | 0 |
| 33 | 3 | 3.2 | 1 | 80 | 0 |
| 34 | 4 | 3.2 | 50 | 20 | 0 |
| 35 | 4 | 3.2 | 1 | 80 | 0 |
| 36 | 5 | 3.2 | 50 | 20 | 0 |
| 37 | 5 | 3.2 | 1 | 80 | 0 |
| 38 | 1 | 3.2 | 50 | 80 | 5 |
| 39 | 1 | 3.2 | 1 | 80 | 5 |
| 40 | 1 | 3.2 | 50 | 20 | 5 |
| 41 | 1 | 3.2 | 1 | 20 | 5 |

Example 42

Preparation of Carbonate Substituted Hydroxyapatite (CHA) Loaded with 50% of Mint Oil and 5% of Zinc Ions 6.4 g of Mint oil was dissolved in 50 ml of a hydroalcoholic mixture (4:1 v/v) and 20% (% w/w) of the mixture was added to 20% aqueous suspension of CHA as in Example 1. Then 9% (% w/w) of 5% (% w/w) aqueous solution of zinc sulfate monohydrate was added. The total suspension was stirred for 15 minutes. The total amount of Mint oil was 50% (% w/w) of CHA and the total amount of zinc expressed as zinc ion was 5% (% w/w) of CHA. Water was then added up to 100% of the total weight and the suspension stirred for further 10 minutes.

Example 43

Preparation of Carbonate Substituted Hydroxyapatite (CHA) Loaded with 1% of Mint Oil and 80% of Copper Ions 6.4 g of Mint oil was dissolved in 0 ml of a hydroalcoholic mixture (4:1 v/v) and 0.25% (% w/w) of the mixture was added to 20% aqueous suspension of CHA as in Example 1. Then 16% (% w/w) of 29% (% w/w) aqueous suspension of tribasic copper sulfate ($Cu_4SO_4(OH)_6 \cdot \frac{1}{2} H_2O$) was added. The total suspension was stirred for 15 minutes. The total amount of Mint oil was 1% (% w/w) of CHA and the total amount of copper expressed as copper ion was 80% (% w/w) of CHA. Water was then added up to 100% of the total weight and the suspension stirred for further 10 minutes.

Example 44

Preparation of Carbonate Substituted Hydroxyapatite (CHA) Loaded with 1% of Clove Oil and 30% of Zinc Ions 6.4 g of Clove oil was dissolved in 50 ml of a hydroalcoholic mixture (4:1 v/v) and 0.25% (% w/w) of the mixture was added to 20% aqueous suspension of CHA as in Example 1. Then 54% (% w/w) of 5% (% w/w) aqueous solution of zinc sulfate monohydrate was added. The total suspension was stirred for 15 minutes. The total amount of Clove oil was 1% (% w/w) of CHA and the total amount of zinc expressed as zinc ion was 30% (% w/w) of CHA. Water was then added up to 100% of the total weight and the suspension stirred for further 10 minutes.

Example 45

Preparation of Carbonate Substituted Hydroxyapatite (CHA) Loaded with 50% of Clove Oil and 20% of Copper Ions 6.4 g of Clove oil was dissolved in 50 ml of a hydroalcoholic mixture (4:1 v/v) and 20% (% w/w) of the mixture was added to 20% aqueous suspension of CHA as in Example 1. Then 4% (% w/w) of 29% (% w/w) aqueous suspension of tribasic copper sulfate ($Cu_4SO_4(OH)_6 \cdot \frac{1}{2} H_2O$) was added. The total suspension was stirred for 15 minutes. The total amount of Clove oil was 50% (% w/w) of CHA and the total amount of copper expressed as copper ion was 20% (% w/w) of CHA. Water was then added up to 100% of the total weight and the suspension stirred for further 10 minutes.

Example 46

Preparation of Carbonate Substituted Hydroxyapatite (CHA) Loaded with 50% of Mint Oil 6.4 g of Mint oil was dissolved in 50 ml of a hydroalcoholic mixture (4:1 v/v) and 20% (% w/w) of the mixture was added to 20% aqueous suspension of CHA as in Example 1. The total suspension was stirred for 15 minutes. The total amount of Mint oil was 50% (% w/w) of CHA. Water was then added up to 100% of the total weight and the suspension stirred for further 10 minutes.

Example 47

Preparation of Carbonate Substituted Hydroxyapatite (CHA) Loaded with 1% of Clove Oil 6.4 g of Clove oil was dissolved in 50 ml of a hydroalcoholic mixture (4:1 v/v) and 0.25% (% w/w) of the mixture was added to 20% aqueous suspension of CHA as in Example 1. The total suspension was stirred for 15 minutes. The total amount of Clove oil was 1% (% w/w) of CHA. Water was then added up to 100% of the total weight and the suspension stirred for further 10 minutes.

TABLE 1

Composition of Extracts 1, 2, 3, 4, and 5

| Oil | Composition % Extract 1 | Composition % Extract 2 | Composition % Extract 3 | Composition % Extract 4 | Composition % Extract 5 |
|---|---|---|---|---|---|
| Mint | 40 | 10 | 40 | 10 | 40 |
| Rosemary | 35 | 15 | 15 | 35 | 15 |
| Ocimum basilicum | 5 | 15 | 15 | 5 | 6 |
| Lemon | 3 | 23 | 4 | 23 | 3 |
| Garlic | 1 | 1 | 10 | 1 | 10 |
| Cloves | 3 | 20 | 3 | 3 | 20 |
| Thyme | 3 | 13 | 3 | 13 | 3 |
| Cinnamon | 10 | 3 | 10 | 10 | 3 |

Example 48

In Vitro Inhibition Tests on *Xanthomonas axonopodis* pv. Citri

Bacterial Strains

NCPPB 409 *Xanthomonas axonopodis* pv. citri strains were bred, respectively, on KB (King et al., 1954), YMA (Miller et al., 1990) and LPGA (Ridè et al., 1983) at 27° C. for 48 h.

In Vitro Inhibition Test (Dilution Method)

Falcon tubes containing 15 mL of LB broth were inseminated with 150 μL of aqueous suspension containing the *Xanthomonas axonopodis* pv. citri strains (about $10^8$ CFU/mL, 0.1 OD600 nm) in order to obtain initial concentrations of each concentration pathogen approx. $10^6$ CFU/mL.

Afterwards, the products of Examples were added to the test tubes at the concentration of 1% as well as their components up to a total concentration of 1%. The contaminated tubes were placed in a rotary stirrer (about 80 rpm) and incubated for 24 hours at 27° C. At time 24 h, 1 mL of contaminated broth was taken and diluted by decimal dilutions; 10 μL of each dilution were deposited on agar substrate plates NSA (Crosse, 1959), specific for the *Xanthomonas axonopodis* pv. Citri strains. The plates were incubated for 48 h at 27° C. and after the incubation the colonies were counted. The used control was sterile deionized water (SDW), as negative control. The experiment was replicated twice. The results are summarized in table 2.

TABLE 2

| Product | Reference example | *Xanthomonas axonopodis* Average population After 24 hours (UFC/ml) |
|---|---|---|
| CHA | Example 1 | 4.65E+08 |
| CHA + Cu (20%) | Example 2 | 3.80E+04 |
| CHA + Cu (80%) | Example 3 | 1.20E+02 |
| CHA + Zn (5%) | Example 4 | 5.21E+06 |
| CHA + Zn (30%) | Example 5 | 8.75E+05 |
| CHA + Cu (80%) + Zn (5%) | Example 6 | 2.92E+02 |
| CHA + Cu (20%) + Zn (30%) | Example 7 | 9.59E+04 |
| CHA + EXTR1 (50%) | Example 8 | 4.85E+07 |
| CHA + EXTR1 (1%) | Example 9 | 1.02E+08 |
| CHA + EXTR2 (50%) | Example 10 | 7.81E+06 |
| CHA + EXTR2 (1%) | Example 11 | 8.52E+07 |
| CHA + EXTR3 (50%) | Example 12 | 8.82E+06 |
| CHA + EXTR3 (1%) | Example 13 | 9.01E+07 |
| CHA + EXTR4 (50%) | Example 14 | 1.22E+07 |
| CHA + EXTR4 (1%) | Example 15 | 9.87E+07 |
| CHA + EXTR5 (50%) | Example 16 | 9.76E+06 |
| CHA + EXTR5 (1%) | Example 17 | 5.42E+07 |
| CHA + EXTR1 (50%) + Zn (5%) | Example 18 | 4.29E+06 |
| CHA + EXTR1 (1%) + Zn (30%) | Example 19 | 1.02E+05 |
| CHA + EXTR2 (50%) + Zn (5%) | Example 20 | 7.25E+05 |
| CHA + EXTR2 (1%) + Zn (30%) | Example 21 | 2.40E+05 |
| CHA + EXTR3 (50%) + Zn (5%) | Example 22 | 8.91E+05 |
| CHA + EXTR3 (1%) + Zn (30%) | Example 23 | 1.01E+05 |
| CHA + EXTR4 (50%) + Zn (5%) | Example 24 | 2.06E+06 |
| CHA + EXTR4 (1%) + Zn (30%) | Example 25 | 9.81E+04 |
| CHA + EXTR5 (50%) + Zn (5%) | Example 26 | 1.23E+06 |
| CHA + EXTR5 (1%) + Zn (30%) | Example 27 | 4.04E+05 |
| CHA + EXTR1 (50%) + Cu (20%) | Example 28 | 2.16E+04 |
| CHA + EXTR1 (1%) + Cu (80.%) | Example 29 | 1.01E+02 |
| CHA + EXTR2 (50%) + Cu (20.%) | Example 30 | 1.81E+04 |
| CHA + EXTR2 (1%) + Cu (80%) | Example 31 | 1.02E+02 |
| CHA + EXTR3 (50%) + Cu (20%) | Example 32 | 1.53E+04 |
| CHA + EXTR3 (1%) + Cu (80%) | Example 33 | 1.06E+02 |
| CHA + EXTR4 (50%) + Cu (20%) | Example 34 | 1.04E+04 |
| CHA + EXTR4 (1%) + Cu (80%) | Example 35 | 1.09E+02 |
| CHA + EXTR5 (50%) + Cu (20%) | Example 36 | 1.00E+04 |
| CHA + EXTR5 (1%) + Cu (80%) | Example 37 | 1.02E+02 |
| CHA + EXTR1 (50%) + Cu (80%) + Zn (5%) | Example 38 | 8.77E+01 |
| CHA + EXTR1 (1%) + Cu (80%) + Zn (5%) | Example 39 | 9.42E+01 |
| CHA + EXTR1 (50%) + Cu (20%) + Zn (30%) | Example 40 | 1.08E+03 |
| CHA + EXTR1 (1%) + Cu (20%) + Zn (30%) | Example 41 | 2.00E+03 |
| CHA + Mint oil (50%) + (Zn 5%) | Example 42 | 8.31E+06 |
| CHA + Mint oil ( 1%) + Cu (80.%) | Example 43 | 4.08E+02 |
| CHA + Clove oil (1%) + Zn (30%) | Example 44 | 5.05E+05 |
| CHA + Clove oil (50%) + Cu (20%) | Example 45 | 4.93E+04 |
| CHA + Mint oil (50%) | Example 46 | 9.95E+07 |
| CHA + Clove oi l (1%) | Example 47 | 7.40E+08 |
| SDW | — | 1.03E+09 |

Discussion of Experiments

The above experiments involved 48 in vitro inhibition tests (dilution method) with *Xanthomonas axonopodis* pv. Citri.

In particular, the experiments of Section II investigated 24 loaded carriers according to a preferred embodiment of the invention and the following three main variables:
 a) Content of ions in the loaded carrier;
 b) Content of vegetable extracts in the loaded carrier; and
 c) Composition of the vegetable extracts in the loaded carrier;
encompassing all different combinations of the main variables a)-c) above, and including also a full set of 23 comparative tests (and 1 test of control).

Content of Ions in the Composition

As far as the content of ions is concerned, loaded carriers with different amounts of zinc and copper ions alone or in combination were tested, ranging from a low to a high level as detailed in the following table:

| | Low level | High level | Example # |
|---|---|---|---|
| Zinc (% by weight as zinc) | 5 | 30 | 18, 20, 22, 24, 26, 38, 39 (low level); 19, 21, 23, 25, 27, 40, 41 (high level) |
| Copper (% by weight as copper) | 20 | 80 | 28, 30, 32, 34, 36, 40, 41 (low level); 29, 31, 33, 35, 37, 38, 39 (high level) |

Hence, both the low and high level for each ion were therefore tested, alone or in combination, varying their amount in order to test also the highest and the lowest zinc/copper ratio.

Content of Vegetable Extracts in the Loaded Carrier

As far as the content of vegetable extracts is concerned, loaded carriers with different amounts of vegetable extract were tested, ranging from a low to a high level as detailed in the following table,

| | Low level | High level | Example # |
|---|---|---|---|
| Vegetable extract | 1 | 50 | 19, 21, 23, 25, 27, 29, 31, 33, 35, 37, 39, 41 (low level); 18, 20, 22, 24, 26, 28, 30, 32, 34, 36, 38, 40 (high level) |

Hence, both the low and high level content of vegetable extracts were therefore tested, and their amount varied with respect to the content of ions, in order to test also the highest and the lowest ion (zinc or copper, or both)/vegetable extract ratio.

Composition of the Vegetable Extracts in the Loaded Carrier

As far as the composition of vegetable extracts is concerned, loaded carriers with five different plant extracts (see Table 1 above) made of mint, thyme, rosemary cloves, garlic, lemon, cinnamon, and *Ocimum basilicum* were tested, each in a defined composition range:

from 10 to 40 weight % of mint extract;
from 15 to 35 weight % of rosemary extract,
from 5 to 15 weight % of *Ocimum basilicum* extract,
from 3 to 23 weight % of lemon extract;
from 1 to 10 weight % of garlic extract;
from 3 to 20 weight % of cloves extract;
from 3 to 13 weight % of thyme extract, and
from 3 to 10 weight % of cinnamon extract;

according to a preferred embodiment of the invention.

The five tested extracts were used in the examples, as detailed in the following table:

|  | extr1 | extr2 | extr3 | extr4 | extr5 |
|---|---|---|---|---|---|
| Example # | 18, 19, 28, 29, 38, 39, 40, 41 | 20, 21, 30, 31 | 22, 23, 32, 33 | 24, 25, 34, 35 | 26, 27, 36, 37 |

The experiments investigated each extract at the lowest and highest value of the composition range according to a preferred embodiment of the invention. For example, extr 1, extr3, and extr5 showed a content of mint extract of 40% (highest value of the composition range), and extr2 and extr4 show a content of mint extract of 10% (lowest value of the composition range), thus investigating the whole range. The same is true for each extract.

Comparative Tests

In the experiments also a full range of comparative examples (Examples 1-17 and 42-47) was included, providing comparison data for each investigated main variable.

In particular, Examples 1-17 allowed comparison between the invention and the elements taken singularly (carbonated substituted hydroxyapatite alone, carbonated substituted hydroxyapatite loaded with ions alone or in mixture, and carbonated substituted hydroxyapatite loaded with the vegetable extracts extr1-extr5 alone), whereas Examples 42-47 provided comparison between the invention and carbonated substituted hydroxyapatite loaded with ions and mint and clove oils alone.

The data obtained from the tested loaded carriers according to the invention and from the comparative examples were then compared and discussed in the following paragraphs.

In the following Part A, the comparison was made taking into consideration Examples 1-17 and hence the elements taken singularly, whereas in the following Part B the comparison was made with respect to carbonated substituted hydroxyapatite loaded with ions and mint and clove oils alone.

Part A

Comparison of Examples 18, 1, 4, and 8

Example 18 related to a loaded carrier of carbonate substituted hydroxyapatite with extr1 at 50% by weight, with zinc ions at 5% by weight, and has been compared with Example 1 (carbonate substituted hydroxyapatite alone), Example 4 (carbonate substituted hydroxyapatite with zinc ions at 5% by weight), and with Example 8 (carbonate substituted hydroxyapatite with extr 1 at 50% by weight) according to the following scheme:

|  | Example 18 | Example 1 | Example 4 | Example 8 |
|---|---|---|---|---|
| *Xanthomonas axonopodis* Average population After 24 hours (UFC/ml) | 4.29E+06 | 4.65E+08 | 5.21E+06 | 4.85E+07 |

As apparent from this comparison, the carbonate substituted hydroxyapatite loaded with 50% by weight of extr1 and 5% of zinc was synergistically more potent against *Xanthomonas axonopodis* compared to the elements tested singularly.

Comparison of Examples 19, 1, 5, and 9

Example 19 related to a loaded carrier of carbonate substituted hydroxyapatite with extr1 at 1% by weight, with zinc ions at 30% by weight, and has been compared with Example 1 (carbonate substituted hydroxyapatite alone), Example 5 (carbonate substituted hydroxyapatite with zinc ions at 30% by weight), and with Example 9 (carbonate substituted hydroxyapatite with extr 1 at 1% by weight) according to the following scheme:

| | Example 19 | Example 1 | Example 5 | Example 9 |
|---|---|---|---|---|
| *Xanthomonas axonopodis* Average population After 24 hours (UFC/ml) | 1.02E+05 | 4.65E+08 | 8.75E+05 | 1.02E+08 |

As apparent from this comparison, the carbonate substituted hydroxyapatite loaded with 1% by weight of extr1 and 30% of zinc was synergistically more potent against *Xanthomonas axonopodis* compared to the elements tested singularly.

Comparison of Examples 20, 1, 4, and 10

Example 20 related to a loaded carrier of carbonate substituted hydroxyapatite with extr2 at 50% by weight, with zinc ions at 5% by weight, and has been compared with Example 1 (carbonate substituted hydroxyapatite alone), Example 4 (carbonate substituted hydroxyapatite with zinc ions at 5% by weight), and with Example 10 (carbonate substituted hydroxyapatite with extr 2 at 50% by weight) according to the following scheme:

| | Example 20 | Example 1 | Example 4 | Example 10 |
|---|---|---|---|---|
| *Xanthomonas axonopodis* Average population After 24 hours (UFC/ml) | 7.25E+05 | 4.65E+08 | 5.21E+06 | 7.81E+06 |

As apparent from this comparison, the carbonate substituted hydroxyapatite loaded with 50% by weight of extr2 and 5% of zinc was synergistically more potent against *Xanthomonas axonopodis* compared to the elements tested singularly.

Comparison of Examples 21, 1, 5, and 11

Example 21 related to a loaded carrier of carbonate substituted hydroxyapatite with extr2 at 1% by weight, with zinc ions at 30% by weight, and has been compared with Example 1 (carbonate substituted hydroxyapatite alone), Example 5 (carbonate substituted hydroxyapatite with zinc ions at 30% by weight), and with Example 11 (carbonate substituted hydroxyapatite with extr 2 at 1% by weight) according to the following scheme:

|  | Example 21 | Example 1 | Example 5 | Example 11 |
| --- | --- | --- | --- | --- |
| *Xanthomonas axonopodis* Average population After 24 hours (UFC/ml) | 2.40E+05 | 4.65E+08 | 8.75E+05 | 8.52E+07 |

As apparent from this comparison, the carbonate substituted hydroxyapatite loaded with 1% by weight of extr2 and 30% of zinc was synergistically more potent against *Xanthomonas axonopodis* compared to the elements tested singularly.

Comparison of Examples 22, 1, 4 and 12

Example 22 related to a loaded carrier of carbonate substituted hydroxyapatite with extr3 at 50% by weight, with zinc ions at 5% by weight, and has been compared with Example 1 (carbonate substituted hydroxyapatite alone), Example 4 (carbonate substituted hydroxyapatite with zinc ions at 5% by weight), and with Example 12 (carbonate substituted hydroxyapatite with extr 3 at 50% by weight) according to the following scheme:

|  | Example 22 | Example 1 | Example 4 | Example 12 |
| --- | --- | --- | --- | --- |
| *Xanthomonas axonopodis* Average population After 24 hours (UFC/ml) | 8.91E+05 | 4.65E+08 | 5.21E+06 | 8.82E+06 |

As apparent from this comparison, the carbonate substituted hydroxyapatite loaded with 50% by weight of extr3 and 5% of zinc was synergistically more potent against *Xanthomonas axonopodis* compared to the elements tested singularly.

Comparison of Examples 23, 1, 5, and 13

Example 23 related to a loaded carrier of carbonate substituted hydroxyapatite with extr3 at 1% by weight, with zinc ions at 30% by weight, and has been compared with Example 1 (carbonate substituted hydroxyapatite alone), Example 5 (carbonate substituted hydroxyapatite with zinc ions at 30% by weight), and with Example 13 (carbonate substituted hydroxyapatite with extr 3 at 1% by weight) according to the following scheme:

|  | Example 23 | Example 1 | Example 5 | Example 13 |
| --- | --- | --- | --- | --- |
| *Xanthomonas axonopodis* Average population After 24 hours (UFC/ml) | 1.01E+05 | 4.65E+08 | 8.75E+05 | 9.01E+07 |

As apparent from this comparison, the carbonate substituted hydroxyapatite loaded with 1% by weight of extr3 and 30% of zinc was synergistically more potent against *Xanthomonas axonopodis* compared to the elements tested singularly.

Comparison of Examples 24, 1, 4, and 14

Example 24 related to a loaded carrier of carbonate substituted hydroxyapatite with extr4 at 50% by weight, with zinc ions at 5% by weight, and has been compared with Example 1 (carbonate substituted hydroxyapatite alone), Example 4 (carbonate substituted hydroxyapatite with zinc ions at 5% by weight), and with Example 14 (carbonate substituted hydroxyapatite with extr 4 at 50% by weight) according to the following scheme:

|  | Example 24 | Example 1 | Example 4 | Example 14 |
| --- | --- | --- | --- | --- |
| *Xanthomonas axonopodis* Average population After 24 hours (UFC/ml) | 2.06E+06 | 4.65E+08 | 5.21E+06 | 1.22E+07 |

As apparent from this comparison, the carbonate substituted hydroxyapatite loaded with 50% by weight of extr4 and 5% of zinc was synergistically more potent against *Xanthomonas axonopodis* compared to the elements tested singularly.

Comparison of Examples 25, 1, 5, and 15

Example 25 related to a loaded carrier of carbonate substituted hydroxyapatite with extr4 at 1% by weight, with zinc ions at 30% by weight, and has been compared with Example 1 (carbonate substituted hydroxyapatite alone), Example 5 (carbonate substituted hydroxyapatite with zinc ions at 30% by weight), and with Example 15 (carbonate substituted hydroxyapatite with extr 4 at 1% by weight) according to the following scheme:

|  | Example 25 | Example 1 | Example 5 | Example 15 |
| --- | --- | --- | --- | --- |
| *Xanthomonas axonopodis* Average population After 24 hours (UFC/ml) | 9.81E+04 | 4.65E+08 | 8.75E+05 | 9.87E+07 |

As apparent from this comparison, the carbonate substituted hydroxyapatite loaded with 50% by weight of extr4 and 30% of zinc was synergistically more potent against *Xanthomonas axonopodis* compared to the elements tested singularly.

Comparison of Examples 26, 1, 4, and 16

Example 26 related to a loaded carrier of carbonate substituted hydroxyapatite with extr5 at 50% by weight, with zinc ions at 5% by weight, and has been compared with Example 1 (carbonate substituted hydroxyapatite alone), Example 4 (carbonate substituted hydroxyapatite with zinc ions at 5% by weight), and with Example 16 (carbonate substituted hydroxyapatite with extr 5 at 50% by weight) according to the following scheme:

|  | Example 26 | Example 1 | Example 4 | Example 16 |
| --- | --- | --- | --- | --- |
| Xanthomonas axonopodis Average population After 24 hours (UFC/ml) | 1.23E+06 | 4.65E+08 | 5.21E+06 | 9.76E+06 |

As apparent from this comparison, the carbonate substituted hydroxyapatite loaded with 50% by weight of extr5 and 5% of zinc was synergistically more potent against *Xanthomonas axonopodis* compared to the elements tested singularly.

Comparison of Examples 27, 1, 5, and 17

Example 27 related to a loaded carrier of carbonate substituted hydroxyapatite with extr5 at 1% by weight, with zinc ions at 30% by weight, and has been compared with Example 1 (carbonate substituted hydroxyapatite alone), Example 5 (carbonate substituted hydroxyapatite with zinc ions at 30% by weight), and with Example 17 (carbonate substituted hydroxyapatite with extr 5 at 1% by weight) according to the following scheme:

|  | Example 27 | Example 1 | Example 5 | Example 17 |
| --- | --- | --- | --- | --- |
| Xanthomonas axonopodis Average population After 24 hours (UFC/ml) | 4.04E+05 | 4.65E+08 | 8.75E+05 | 5.42E+07 |

As apparent from this comparison, the carbonate substituted hydroxyapatite loaded with 1% by weight of extr5 and 30% of zinc was synergistically more potent against *Xanthomonas axonopodis* compared to the elements tested singularly.

Comparison of Examples 28, 1, 2, and 8

Example 28 related to a loaded carrier of carbonate substituted hydroxyapatite with extr1 at 50% by weight, with copper ions at 20% by weight, and has been compared with Example 1 (carbonate substituted hydroxyapatite alone), Example 2 (carbonate substituted hydroxyapatite with copper ions at 20% by weight), and with Example 8 (carbonate substituted hydroxyapatite with extr 1 at 50% by weight) according to the following scheme:

|  | Example 28 | Example 1 | Example 2 | Example 8 |
| --- | --- | --- | --- | --- |
| Xanthomonas axonopodis Average population After 24 hours (UFC/ml) | 2.16E+04 | 4.65E+08 | 3.80E+04 | 4.85E+07 |

As apparent from this comparison, the carbonate substituted hydroxyapatite loaded with 50% by weight of extr1 and 20% of copper was synergistically more potent against *Xanthomonas axonopodis* compared to the elements tested singularly.

Comparison of Examples 29, 1, 3, and 9

Example 29 related to a loaded carrier of carbonate substituted hydroxyapatite with extr1 at 1% by weight, with copper ions at 80% by weight, and has been compared with Example 1 (carbonate substituted hydroxyapatite alone), Example 3 (carbonate substituted hydroxyapatite with copper ions at 80% by weight), and with Example 9 (carbonate substituted hydroxyapatite with extr 1 at 1% by weight) according to the following scheme:

|  | Example 29 | Example 1 | Example 3 | Example 9 |
| --- | --- | --- | --- | --- |
| Xanthomonas axonopodis Average population After 24 hours (UFC/ml) | 1.01E+02 | 4.65E+08 | 1.20E+02 | 1.02E+08 |

As apparent from this comparison, the carbonate substituted hydroxyapatite loaded with 1% by weight of extr1 and 80% of copper was synergistically more potent against *Xanthomonas axonopodis* compared to the elements tested singularly.

Comparison of Examples 30, 1, 2, and 10

Example 30 related to a loaded carrier of carbonate substituted hydroxyapatite with extr2 at 50% by weight, with copper ions at 20% by weight, and has been compared with Example 1 (carbonate substituted hydroxyapatite alone), Example 2 (carbonate substituted hydroxyapatite with copper ions at 20% by weight), and with Example 10 (carbonate substituted hydroxyapatite with extr 1 at 50% by weight) according to the following scheme:

|  | Example 30 | Example 1 | Example 2 | Example 10 |
| --- | --- | --- | --- | --- |
| Xanthomonas axonopodis Average population After 24 hours (UFC/ml) | 1.81E+04 | 4.65E+08 | 3.80E+04 | 7.81E+06 |

As apparent from this comparison, the carbonate substituted hydroxyapatite loaded with 50% by weight of extr2 and 20% of copper was synergistically more potent against *Xanthomonas axonopodis* compared to the elements tested singularly.

Comparison of Examples 31, 1, 3, and 11

Example 31 related to a loaded carrier of carbonate substituted hydroxyapatite with extr2 at 1% by weight, with copper ions at 80% by weight, and has been compared with Example 1 (carbonate substituted hydroxyapatite alone), Example 3 (carbonate substituted hydroxyapatite with copper ions at 80% by weight), and with Example 11 (carbonate substituted hydroxyapatite with extr 2 at 1% by weight) according to the following scheme:

|  | Example 31 | Example 1 | Example 3 | Example 11 |
|---|---|---|---|---|
| *Xanthomonas axonopodis* Average population After 24 hours (UFC/ml) | 1.02E+02 | 4.65E+08 | 1.20E+02 | 8.52E+07 |

As apparent from this comparison, the carbonate substituted hydroxyapatite loaded with 1% by weight of extr2 and 80% of copper was synergistically more potent against *Xanthomonas axonopodis* compared to the elements tested singularly.

Comparison of Examples 32, 1, 2, and 12

Example 32 related to a loaded carrier of carbonate substituted hydroxyapatite with extr3 at 50% by weight, with copper ions at 20% by weight, and has been compared with Example 1 (carbonate substituted hydroxyapatite alone), Example 2 (carbonate substituted hydroxyapatite with copper ions at 20% by weight), and with Example 12 (carbonate substituted hydroxyapatite with extr 3 at 50% by weight) according to the following scheme:

| | Example 32 | Example 1 | Example 2 | Example 12 |
|---|---|---|---|---|
| *Xanthomonas axonopodis* Average population After 24 hours (UFC/ml) | 1.53E+04 | 4.65E+08 | 3.80E+04 | 8.82E+06 |

As apparent from this comparison, the carbonate substituted hydroxyapatite loaded with 50% by weight of extr3 and 20% of copper was synergistically more potent against *Xanthomonas axonopodis* compared to the elements tested singularly.

Comparison of Examples 33, 1, 3, and 13

Example 33 related to a loaded carrier of carbonate substituted hydroxyapatite with extr3 at 1% by weight, with copper ions at 80% by weight, and has been compared with Example 1 (carbonate substituted hydroxyapatite alone), Example 3 (carbonate substituted hydroxyapatite with copper ions at 80% by weight), and with Example 13 (carbonate substituted hydroxyapatite with extr 3 at 1% by weight) according to the following scheme:

| | Example 33 | Example 1 | Example 3 | Example 13 |
|---|---|---|---|---|
| *Xanthomonas axonopodis* Average population After 24 hours (UFC/ml) | 1.06E+02 | 4.65E+08 | 1.20E+02 | 9.01E+07 |

As apparent from this comparison, the carbonate substituted hydroxyapatite loaded with 1% by weight of extr3 and 80% of copper was synergistically more potent against *Xanthomonas axonopodis* compared to the elements tested singularly.

Comparison of Examples 34, 1, 2 and 14

Example 34 related to a loaded carrier of carbonate substituted hydroxyapatite with extr4 at 50% by weight, with copper ions at 20% by weight, and has been compared with Example 1 (carbonate substituted hydroxyapatite alone), Example 2 (carbonate substituted hydroxyapatite with copper ions at 20% by weight), and with Example 14 (carbonate substituted hydroxyapatite with extr 4 at 50% by weight) according to the following scheme:

| | Example 34 | Example 1 | Example 2 | Example 14 |
|---|---|---|---|---|
| *Xanthomonas axonopodis* Average population After 24 hours (UFC/ml) | 1.04E+04 | 4.65E+08 | 3.80E+04 | 1.22E+07 |

As apparent from this comparison, the carbonate substituted hydroxyapatite loaded with 50% by weight of extr4 and 20% of copper was synergistically more potent against *Xanthomonas axonopodis* compared to the elements tested singularly.

Comparison of Examples 35, 1, 3 and 15

Example 35 related to a loaded carrier of carbonate substituted hydroxyapatite with extr 4 at 1% by weight, with copper ions at 80% by weight, and has been compared with Example 1 (carbonate substituted hydroxyapatite alone), Example 3 (carbonate substituted hydroxyapatite with copper ions at 80% by weight), and with Example 15 (carbonate substituted hydroxyapatite with extr 4 at 1% by weight) according to the following scheme:

| | Example 35 | Example 1 | Example 3 | Example 15 |
|---|---|---|---|---|
| *Xanthomonas axonopodis* Average population After 24 hours (UFC/ml) | 1.09E+02 | 4.65E+08 | 1.20E+02 | 9.87E+07 |

As apparent from this comparison, the carbonate substituted hydroxyapatite loaded with 1% by weight of extr4 and 80% of copper was synergistically more potent against *Xanthomonas axonopodis* compared to the elements tested singularly.

Comparison of Examples 36, 1, 2, and 16

Example 36 related to a loaded carrier of carbonate substituted hydroxyapatite with extr 5 at 50% by weight, with copper ions at 20% by weight, and has been compared with Example 1 (carbonate substituted hydroxyapatite alone), Example 2 (carbonate substituted hydroxyapatite with copper ions at 20% by weight), and with Example 16 (carbonate substituted hydroxyapatite with extr 5 at 50% by weight) according to the following scheme:

| | Example 36 | Example 1 | Example 2 | Example 16 |
|---|---|---|---|---|
| *Xanthomonas axonopodis* Average population After 24 hours (UFC/ml) | 1.00E+04 | 4.65E+08 | 3.80E+04 | 9.76E+06 |

As apparent from this comparison, the carbonate substituted hydroxyapatite loaded with 50% by weight of extr5 and 20% of copper was synergistically more potent against *Xanthomonas axonopodis* compared to the elements tested singularly.

Comparison of Examples 37, 1, 3 and 17

Example 37 related to a loaded carrier of carbonate substituted hydroxyapatite with extr5 at 1% by weight, with copper ions at 80% by weight, and has been compared with Example 1 (carbonate substituted hydroxyapatite alone), Example 3 (carbonate substituted hydroxyapatite with copper ions at 80% by weight), and with Example 17 (carbonate substituted hydroxyapatite with extr 5 at 1% by weight) according to the following scheme:

|  | Example 37 | Example 1 | Example 3 | Example 17 |
|---|---|---|---|---|
| *Xanthomonas axonopodis* Average population After 24 hours (UFC/ml) | 1.02E+02 | 4.65E+08 | 1.20E+02 | 5.42E+07 |

As apparent from this comparison, the carbonate substituted hydroxyapatite loaded with 1% by weight of extr5 and 80% of copper was synergistically more potent against *Xanthomonas axonopodis* compared to the elements tested singularly.

Comparison of Examples 38, 1, 6, and 8

Example 38 related to a loaded carrier of carbonate substituted hydroxyapatite with extr1 at 50% by weight, with copper ions at 80% by weight and zinc ions at 5% by weight, and has been compared with Example 1 (carbonate substituted hydroxyapatite alone), Example 6 (carbonate substituted hydroxyapatite with copper ions at 80% by weight and zinc ions at 5% by weight), and with Example 8 (carbonate substituted hydroxyapatite with extr 1 at 50% by weight) according to the following scheme:

|  | Example 38 | Example 1 | Example 6 | Example 8 |
|---|---|---|---|---|
| *Xanthomonas axonopodis* Average population After 24 hours (UFC/ml) | 8.77E+01 | 4.65E+08 | 2.92E+02 | 4.85E+07 |

As apparent from this comparison, the carbonate substituted hydroxyapatite loaded with 50% by weight of extr1 with copper ions at 80% by weight and zinc ions at 5% by weight was synergistically more potent against *Xanthomonas axonopodis* compared to the elements tested singularly.

Comparison of Examples 39, 1, 6, and 9

Example 39 related to a loaded carrier of carbonate substituted hydroxyapatite with extr1 at 1% by weight, with copper ions at 80% by weight and zinc ions at 5% by weight, and has been compared with Example 1 (carbonate substituted hydroxyapatite alone), Example 6 (carbonate substituted hydroxyapatite with copper ions at 80% by weight and zinc ions at 5% by weight), and with Example 9 (carbonate substituted hydroxyapatite with extr1 at 50% by weight) according to the following scheme:

|  | Example 39 | Example 1 | Example 6 | Example 9 |
|---|---|---|---|---|
| *Xanthomonas axonopodis* Average population After 24 hours (UFC/ml) | 9.42E+01 | 4.65E+08 | 2.92E+02 | 1.02E+08 |

As apparent from this comparison, the carbonate substituted hydroxyapatite loaded with 1% by weight of extr1 with copper ions at 80% by weight and zinc ions at 5% by weight was synergistically more potent against *Xanthomonas axonopodis* compared to the elements tested singularly.

Comparison of Examples 40, 1, 7, and 8

Example 40 related to a loaded carrier of carbonate substituted hydroxyapatite with extr1 at 50% by weight, with copper ions at 20% by weight and zinc ions at 30% by weight, and has been compared with Example 1 (carbonate substituted hydroxyapatite alone), Example 7 (carbonate substituted hydroxyapatite with copper ions at 20% by weight and zinc ions at 30% by weight), and with Example 8 (carbonate substituted hydroxyapatite with extr 1 at 50% by weight) according to the following scheme:

|  | Example 40 | Example 1 | Example 7 | Example 8 |
|---|---|---|---|---|
| *Xanthomonas axonopodis* Average population After 24 hours (UFC/ml) | 1.08E+03 | 4.65E+08 | 9.59E+04 | 4.85E+07 |

As apparent from this comparison, the carbonate substituted hydroxyapatite loaded with 50% by weight of extr1 with copper ions at 20% by weight and zinc ions at 30% by weight was synergistically more potent against *Xanthomonas axonopodis* compared to the elements tested singularly.

Comparison of Examples 41, 1, 7, 9

Example 41 related to a loaded carrier of carbonate substituted hydroxyapatite with extr1 at 1% by weight, with copper ions at 20% by weight and zinc ions at 30% by weight, and has been compared with Example 1 (carbonate substituted hydroxyapatite alone), Example 7 (carbonate substituted hydroxyapatite with copper ions at 20% by weight and zinc ions at 30% by weight), and with Example 9 (carbonate substituted hydroxyapatite with extr 1 at 1% by weight) according to the following scheme:

|  | Example 41 | Example 1 | Example 7 | Example 9 |
|---|---|---|---|---|
| *Xanthomonas axonopodis* Average population After 24 hours (UFC/ml) | 2.00E+03 | 4.65E+08 | 9.59E+04 | 1.02E+08 |

As apparent from this comparison, the carbonate substituted hydroxyapatite loaded with 1% by weight of extr1 with copper ions at 20% by weight and zinc ions at 30% by weight was synergistically more potent against *Xanthomonas axonopodis* compared to the elements tested singularly.

Part B

Comparison of Examples 18, 20, 22, 24, and 26 with Example 42

Examples 18, 20, 22, 24, and 26 related to a loaded carrier of carbonate substituted hydroxyapatite with extr 1-5 at 50% by weight, with zinc ions at 5% by weight, and have been compared with Example 42 (carbonate substituted hydroxyapatite with mint oil at 50% and zinc ions at 5% by weight), according to the following scheme:

|  | Example 18 | Example 20 | Example 22 | Example 24 | Example 26 | Example 42 |
| --- | --- | --- | --- | --- | --- | --- |
| *Xanthomonas axonopodis* Average population After 24 hours (UFC/ml) | 4.29E+06 | 7.25E+05 | 8.91E+05 | 2.06E+06 | 1.23E+06 | 8.31E+06 |

As apparent from this comparison, the carbonate substituted hydroxyapatite loaded with 50% by weight of extr1-5 with zinc ions at 5% by weight were synergistically more potent against *Xanthomonas axonopodis* compared to carbonated substituted hydroxyapatite loaded with 50% by weight of mint oil with zinc ions at 5% by weight.

Comparison of Examples 29, 31, 33, 35, and 37 with Example 43

Examples 29, 31, 33, 35, and 37 related to a loaded carrier of carbonate substituted hydroxyapatite with extr1-5 at 1% by weight, with copper ions at 80% by weight, and have been compared with Example 43 (carbonate substituted hydroxyapatite with mint oil at 1% and copper ions at 80% by weight), according to the following scheme:

|  | Example 29 | Example 31 | Example 33 | Example 35 | Example 37 | Example 43 |
| --- | --- | --- | --- | --- | --- | --- |
| *Xanthomonas axonopodis* Average population After 24 hours (UFC/ml) | 1.01E+02 | 1.02E+02 | 1.06E+02 | 1.09E+02 | 1.02E+02 | 4.08E+02 |

As apparent from this comparison, the carbonated substituted hydroxyapatite loaded with 1% by weight of extr1-5 with copper ions at 80% by weight were synergistically more potent against *Xanthomonas axonopodis* compared to carbonated substituted hydroxyapatite loaded with 1% by weight of mint oil with copper ions at 80% by weight.

Comparison of Examples 19, 21, 23, 25, and 27 with Example 44

Examples 19, 21, 23, 25, and 27 related to a loaded carrier of carbonate substituted hydroxyapatite with extr 1-5 at 1% by weight, with zinc ions at 30% by weight, and have been compared with Example 44 (carbonate substituted hydroxyapatite with clove oil at 1% and zinc ions at 30% by weight), according to the following scheme:

|  | Example 19 | Example 21 | Example 23 | Example 25 | Example 27 | Example 44 |
| --- | --- | --- | --- | --- | --- | --- |
| *Xanthomonas axonopodis* Average population After 24 hours (UFC/ml) | 1.02E+05 | 2.40E+05 | 1.01E+05 | 9.81E+04 | 4.04E+05 | 5.05E+05 |

As apparent from this comparison, the carbonated substituted hydroxyapatite loaded with 1% by weight of extr 1-5 with zinc ions at 30% by weight were synergistically more potent against *Xanthomonas axonopodis* compared to carbonated substituted hydroxyapatite loaded with 1% by weight of clove oil with zinc ions at 30% by weight.

Comparison of Examples 28, 30, 32, 34, and 36 with Example 45

Examples 28, 30, 32, 34, and 36 related to a loaded carrier of carbonate substituted hydroxyapatite with extr 1-5 at 50% by weight, with copper ions at 20% by weight, and have been compared with Example 45 (carbonate substituted hydroxyapatite with clove oil at 50% and copper ions at 20% by weight), according to the following scheme:

|  | Example 28 | Example 30 | Example 32 | Example 34 | Example 36 | Example 45 |
| --- | --- | --- | --- | --- | --- | --- |
| *Xanthomonas axonopodis* Average population After 24 hours (UFC/ml) | 2.16E+04 | 1.81E+04 | 1.53E+04 | 1.04E+04 | 1.00E+04 | 4.93E+04 |

As apparent from this comparison, the carbonate substituted hydroxyapatite loaded with 50% by weight of extr 1-5 with copper ions at 20% by weight were synergistically more potent against *Xanthomonas axonopodis* compared to carbonate substituted hydroxyapatite loaded with 50% by weight of clove oil with copper ions at 20% by weight.

The invention claimed is:

1. A carrier loaded with bioactive substances, wherein the carrier is carbonate substituted hydroxyapatite; and
the bioactive substances are an ion and a plant extract, wherein said ion is selected from the group consisting of Cu, Zn and a combination thereof,
wherein said bioactive substances are adsorbed on the hydroxyapatite,
wherein in said carbonate substituted hydroxyapatite the copper ion is adsorbed in an amount ranging from 20 to 80 weight % with respect to the weight of said carbonate substituted hydroxyapatite and/or the zinc ion is adsorbed in an amount ranging from 5 to 30 weight % with respect to the weight of said carbonate substituted hydroxyapatite, wherein said plant extract is adsorbed in an amount ranging from 1 to 50 weight % with respect to the weight of said carbonate substituted hydroxyapatite, and
wherein the plant extract consists of:
from 10 to 40 weight % of mint extract;
from 15 to 35 weight % of rosemary extract;
from 5 to 15 weight % of *Ocimum basilicum* extract;
from 3 to 23 weight % of lemon extract;
from 1 to 10 weight % of garlic extract;
from 3 to 20 weight % of clove extract;
from 3 to 13 weight % of thyme extract; and
from 3 to 10 weight % of cinnamon extract.

2. The carrier loaded with bioactive substances according to claim 1, wherein the carrier is in the form of an aggregate of carbonate substituted hydroxyapatite particles, and wherein the aggregate has a size between 0.5 and 5 μm.

3. The carrier loaded with bioactive substances according to claim 1, wherein the carbonate substituted hydroxyapatite has the following formula:

$$Ca_{(10)}(PO_4)_{(6-y)}(CO_3)_y(OH)_2$$

wherein y is between 0.002 and 2.0.

4. A composition comprising the carrier loaded with bioactive substances according to claim 1, in a quantity of 5-70% in relation to the total weight of dry material of the composition.

* * * * *